(12) United States Patent
Trounson, III

(10) Patent No.: US 11,561,528 B2
(45) Date of Patent: Jan. 24, 2023

(54) INTEGRATED CAD/CAM/CNC SOFTWARE MACHINE TOOL AND MACHINE TOOL THEREWITH

(71) Applicant: James Edmund Trounson, III, Chino, CA (US)

(72) Inventor: James Edmund Trounson, III, Chino, CA (US)

( * ) Notice: Subject to any disclaimer, the term of this patent is extended or adjusted under 35 U.S.C. 154(b) by 173 days.

(21) Appl. No.: 16/622,160

(22) PCT Filed: Jun. 15, 2018

(86) PCT No.: PCT/US2018/037743
§ 371 (c)(1),
(2) Date: Dec. 12, 2019

(87) PCT Pub. No.: WO2018/232234
PCT Pub. Date: Dec. 20, 2018

(65) Prior Publication Data
US 2020/0125068 A1  Apr. 23, 2020

Related U.S. Application Data

(60) Provisional application No. 62/520,435, filed on Jun. 15, 2017.

(51) Int. Cl.
*G05B 19/4097* (2006.01)
*G05B 19/4093* (2006.01)

(52) U.S. Cl.
CPC ... *G05B 19/4097* (2013.01); *G05B 19/40938* (2013.01); *G05B 2219/32128* (2013.01);
(Continued)

(58) Field of Classification Search
None
See application file for complete search history.

(56) References Cited

U.S. PATENT DOCUMENTS

| 2006/0058908 A1* | 3/2006 | Kamiya | G05B 19/4093 700/186 |
| 2006/0095142 A9* | 5/2006 | Evans | G05B 19/4097 700/193 |
| 2017/0308055 A1 | 10/2017 | Hoshino et al. | |

FOREIGN PATENT DOCUMENTS

| EP | 1290517 B1 | 2/2007 |
| WO | 01/88647 A1 | 11/2001 |
| WO | 2016/067342 A1 | 5/2016 |

OTHER PUBLICATIONS

International Search Report dated Nov. 7, 2018, issued in corresponding International Application Mo. PCT/US2018/037743, filed Jun. 15, 2018, 2 pages.
(Continued)

*Primary Examiner* — Sean Shechtman
(74) *Attorney, Agent, or Firm* — Christensen O'Connor Johnson Kindness PLLC

(57) ABSTRACT

A combination of electronic hardware, a microprocessor (embodied, e.g., in a personal-style computer ("PC")), and control software blended together with unique systems integration techniques. When stationed at a machine tool, the result is an grated, interactive and intuitive machine tool or workstation capable of computer aided design (CAD), optional reverse engineering parts via coordinate measurement machining (CMM), toolpath generation computer aided manufacturing (CAM), and direct machine tool control (Direct CNC) by one person at one work station with a common human machine interface (HMI) and common file formats.

15 Claims, 22 Drawing Sheets

(52) U.S. Cl.
CPC .............. *G05B 2219/35216* (2013.01); *G05B 2219/37443* (2013.01)

(56) References Cited

OTHER PUBLICATIONS

International Preliminary Report on Patentability and Written Opinion dated Dec. 17, 2019, issued in corresponding International Application No. PCT/US2018/037743 , filed Jun. 15, 2018, 15 pages.

\* cited by examiner

INTEGRATED CAD/CAM/CNC SOFTWARE MACHINE TOOL AND MACHINE TOOL THEREWITH

CROSS-REFERENCES TO RELATED APPLICATIONS

The present application claims the benefit of U.S. Provisional Application No. 62/520,435, filed Jun. 15, 2017, and International Application No. PCT/US2018/037743, filed Jun. 15, 2018, which are incorporated by reference herein in their entirety.

BACKGROUND

CNC machine tools have been around for many years for producing a machine part from raw material, such as sheet steel, billet aluminum, etc. A CNC machine tool refers to a large heavy machine which is controlled by servo motors to move the raw material, referred to sometimes as a workpiece, relative to a cutting tool in a linear and/or rotational manner. This movement enables a cutting tool to pass through the workpiece to remove material accurately from the workpiece, thereby producing a machine part, or one process state of the machine part.

Part manufacturing by use of CNC machine tools can be divided into three distinct disciplines. Design (CAD), toolpath strategies (CAM) & manufacturing (CNC). Each of these disciplines can be further divided into sub-disciplines. Quite often these disciplines do not operate serially, instead being performed over multiple revisions until all requirements are met.

Conventional systems typically have three independent systems, one for each of the three distinct disciplines. These systems are usually in physically separate locations. CAD and CAM are software tools, while machine tools are a combination of software, electronics and mechanical systems. Since these systems are general independent systems, revisions to one system may require completely regenerating another (i.e., if the CAD design changes, the new CAD file may have to be reimported and require a new CAM program as well).

Depending on the part complexity and skill level of the individuals performing these disciplines, it may require one to hundreds of individuals to achieve the desired results. The time allocated to each of these disciplines maybe, but not always equal to each other.

SUMMARY

In accordance with an aspect of the present disclosure, a computer implemented method is provided for machining a workpiece with one or more tools via one or more machining operations on an integrated workstation. The computer implemented method comprises the steps of obtaining a computer aided design (CAD) file indicative of a physical part to be machined, generating computer aided manufacturing (CAM) instructions from the CAD file without the use of GCodes, and machining the workpiece according to the generated CAM instructions.

In some embodiments of the computer implemented method, obtaining a computer aided design (CAD) file indicative of a physical part to be machined includes creating the computer aided design (CAD) file on a computer based on operator input.

In some embodiments of the computer implemented method, creating the CAD file includes carrying out a sequence of CAD operations, wherein the sequence of CAD operations are rendered in the GUI as a list that includes editable parameters. In an embodiment, the editable parameters includes one of coordinate position, dimensions, and material type.

In some embodiments of the computer implemented method, obtaining a computer aided design (CAD) file indicative of a physical part to be machined includes generating the computer aided design (CAD) file on the computer via a coordinate measurement machining (CMM) process.

In some embodiments of the computer implemented method, obtaining a computer aided design (CAD) file indicative of a physical part to be machined includes fetching the computer aided design (CAD) file from a parts library stored in memory.

In some embodiments, the computer implemented method further including checking the computer aided manufacturing (CAM) instructions generated from the CAD file and changing one or more parameters of the CAD file. In an embodiment, the one or more parameters includes a measurement selected from a length, a width, a height, a diameter, and a radius.

In some embodiments of the computer implemented method, generating CAM instructions includes generating a first tool path with user inputted parameters; and generating a second tool path with user inputted parameters.

In some embodiments, the computer implemented method further comprises changing at least one parameter of the user inputted parameters of the first or second tool path, wherein a change to the least one parameter automatically changes a corresponding parameter of the CAD file.

In some embodiments of the computer implemented method, machining the workpiece according to the generated CAM instructions includes, via user input, selecting at least one of the first and second tool paths and activating CNC start instructions.

In some embodiments, the computer implemented method further comprises storing information representative of one or more tools loaded into a tool table, and accessing the information representative of one or more tools when generating the CAM instructions.

In some embodiments, the computer implemented method further comprises rendering a graphical user interface having a number of interface sections, each interface section having one or more control elements, wherein a first interface section of the number of interface sections includes one or more control elements that provide computer aided manufacturing (CAM) control and a second interface section includes one or more control elements that provide computer aided design (CAD) control.

In some embodiments, the computer implemented method further comprises toggling between the computer aided design (CAD) control and a computer numerical control (CNC) control at the second interface section.

In some embodiments of the computer implemented method, obtaining a computer aided design (CAD) file indicative of a physical part to be machined includes interacting interaction with the second first graphical user interface section; wherein said generating computer aided manufacturing (CAM) instructions from the CAD file includes interacting with the first graphical user interface section, and wherein said machining the workpiece according to the generated CAM instructions includes interacting with a computer numerical control (CNC) control of a third graphical user interface section or the computer numerical control (CNC) control of second graphical user interface section.

In some embodiments of the computer implemented method, said obtaining a computer aided design (CAD) file indicative of a physical part to be machined comprises:

determining whether the computer aided design (CAD) file indicative of a physical part has been previously generated and is available for use;

if the computer aided design (CAD) file indicative of a physical part has not been previously generated or is not available for use, determining whether a specimen of the physical part is available;

if a specimen of the physical part is available, generating the computer aided design (CAD) file with the workstation via a coordinate measurement machining (CMM) process; and if a specimen of the physical part is not available, generating the CAD file by carrying out a sequence of CAD operations with the workstation.

In some embodiments of the computer implemented method, said generating computer aided manufacturing (CAM) instructions from the CAD file without the use of GCodes comprises generating a first tool path by selecting at least one object of the CAD file, selecting a tool and tool path parameters.

In some embodiment, the computer implemented method further comprises:

verifying that the first tool path that was generated is correct; and if a determination is made that the first tool path that was generated is not correct, editing the generated first tool path.

In some embodiments of the computer implemented method, said machining the workpiece according to the generated CAM instructions includes verifying that a workpiece is secured in the workstation;

obtaining a request to begin machining the workpiece, and operating the workstation to machine the workpiece secured in the workstation this the one or more tools according to the generated CAM instructions.

In accordance with another aspect of the present disclosure, the implemented methods of the claimed subject matter are carried out by an integrated workstation that includes a machine tool comprising a table for supporting the workpiece, at least one spindle, one or more servo motors configured to move the spindle with respect to the table, a set of tools, and a computer programmed to carry out each computer implemented method.

In accordance with another aspect of the present disclosure, a computer controlled apparatus for machining a workpiece is provided. The apparatus comprises a base; a workpiece support mounted on the base and configured to support a workpiece; a set of tools, each tool configured to remove material from the workpiece; a spindle configured to carry and rotate a tool from the set of tools; one or more drives configured and arranged to move the spindle with respect to the workpiece, the one or more drives including one or more electric motors; and a computing device supported by or position adjacent the base. The computing device comprises a processor and computer readable medium that stores instructions that when implemented by the processor, cause the computing device to perform the methods of the claimed subject matter.

In accordance with another aspect of the present disclosure, a computer controlled apparatus for machining a workpiece is provided. The apparatus comprises a base; a workpiece support mounted on the base and configured to support a workpiece; a set of tools, each tool configured to remove material from the workpiece; a spindle configured to carry and rotate a tool from the set of tools; one or more drives configured and arranged to move the spindle with respect to the workpiece, the one or more drives including one or more electric motors; and a computing device supported by or position adjacent the base. The computing device comprises a processor and computer program product comprising a sequence of instructions for implementing the methods of the claimed subject matter, when loaded into and executed by the processor.

In accordance with another aspect of the present disclosure, a nontransitory computer-readable medium is provided having computer-executable instructions stored thereon that, in response to execution by one or more processors of a computing device, cause the computing device to perform the methods of the claimed subject matter.

In accordance with another aspect of the present disclosure, a computer controlled apparatus for machining a workpiece is provided. The apparatus comprises a base; a workpiece support mounted on the base and configured to support a workpiece; a set of tools, each tool configured to remove material from the workpiece; a spindle configured to carry and rotate a tool from the set of tools; one or more drives configured and arranged to move the spindle with respect to the workpiece, the one or more drives including one or more electric servomotors; and a computing device supported by the base. The computing device in some embodiments comprises a processor, a display, and computer program product stored in memory, that when implemented by the processor, cause the display to render a graphical user interface comprising a first interface section having one or more control elements that provide computer aided manufacturing (CAM) control; and a second interface section having one or more control elements that can toggle between computer aided design (CAD) control and computer numerical control (CNC) control.

In accordance with another aspect of the present disclosure, a non-transitory computer-readable medium is provided having instructions stored thereon that, when executed, cause a computing device to: display at least a first interface section, a second interface section and a third interface section, wherein each of the first, second and third interface sections include user manipulated controls; receive a request from one of the interface sections to generate CAM instructions corresponding to a CAD part rendered by the computing device, the request causing a set of CAM instructions to be generated; and receive a request from one of the interface sections to begin manufacturing a machine part via execution of the set of CAM instructions.

In some embodiments, the non-transitory computer-readable medium further has instructions stored thereon that, when executed, cause a computing device to: generate a computer aided design (CAD) part based on a plurality of user inputs representing a sequence of operations; and display a list indicative of the sequence of operations inputted by the user in one of the interface sections.

In some embodiments, the non-transitory computer-readable medium further has instructions stored thereon that, when executed, cause a computing device to: receive a request to edit information displayed by the list indicative of the sequence of operations via one of the user manipulable controls; and in response to receiving the request to edit said information, automatically editing information associated with the CAM instructions that corresponds to the edited information.

In some embodiments, the non-transitory computer-readable medium further has instructions stored thereon that, when executed, cause a computing device to: receive a request to load a tool into a tool table; and in response to receiving the request, automatically store information representative of the loaded tool in a table of tools section displayed by one of the interface sections that is accessible when generating the CAM instructions.

In accordance with another aspect of the present disclosure, a computer controlled apparatus for machining a workpiece is provided. The apparatus comprises a base; a workpiece support mounted on the base and configured to support a workpiece; a set of tools, each tool configured to remove material from the workpiece; a spindle configured to carry and rotate a tool from the set of tools; one or more linear drives configured and arranged to move the spindle with respect to the workpiece, the one or more linear drives including one or more electric servomotors; and a personal computer associated with the base, the personal computer programed to perform the methods of the claimed subject matter.

In accordance with another aspect of the present disclosure, a workstation is provided. The workstation comprises a machine tool and a personal computer. The personal computer in some embodiments is programmed to integrally carry out, via user input, computer aided design, computer aided manufacturing, and control numerical control for manufacturing a machine part from the workpiece.

In accordance with another aspect of the present disclosure, a computer program product is provided having instructions, that when executed by a personal computer, cause: a two dimensional or three dimensional geometric representation of a machine part to be generated; one or more tool paths to be generated, the tool paths represented by computer instructions for producing a feature of the geometric representation of a machine part; and control movement of one or more tools of a machine tool for machining a workpiece according to the generated tool paths without conversion of said computer instructions.

In accordance with another aspect of the present disclosure, a graphical user interface (GUI) is provided. The GUI, when rendered by at least one computing device of a machine tool, displays: a first interface section providing CAD control; a second interface section providing CAM control; and a third interface section providing CNC control.

In some embodiments, the GUI further comprises a fourth interface section providing CMM control.

In accordance with another aspect of the present disclosure, a graphical user interface is provided. The GUI, when rendered by at least one computing device of a machine tool, displays: a first interface section providing CAM control; and a second interface section that can toggle between CAD control and CNC control.

In some embodiments of the graphical user interface, the second interface section toggles between CAD control and CNC controls via user selectable tabs.

In accordance with another aspect of the present disclosure, a computer controlled workstation is provided for machining a workpiece to form a machine part. The workstation comprises machine tool having a base, a workpiece support mounted on the base and configured to support a workpiece, a set of tools, each tool configured to remove material from the workpiece, a spindle configured to carry and rotate a tool selected from the set of tools, and a plurality of drives configured and arranged to move the spindle with respect to the workpiece, the plurality of drives including one or more servomotors. The workstation also includes a computing device supported by or positioned adjacent the machine tool. The computing device in some embodiments comprises a processor and computer readable media that when implemented by the processor, cause the computing device to: generate a CAD file representative of the machine part via user interaction with a first graphical user interface section displayed on a display; generate one or more tool paths corresponding to the CAD file via user interaction with a second graphical user interface section displayed on the display; and move the spindle according to the one or more generated tool paths via user interaction with the first graphical user interface section or a third graphical user interface section displayed on the display.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of disclosed technology will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following disclosure will present examples that provide a combination of electronic hardware, a microprocessor (embodied, e.g., in a personal-style computer), and control software blended together with unique systems integration techniques. When stationed at a machine tool, the result is an integrated, interactive and intuitive machine tool or workstation capable of computer aided design (CAD), optional reverse engineering parts via coordinate measurement machining (CMM), toolpath generation computer aided manufacturing (CAM), and direct machine tool control (Direct CNC) by one person at one work station with a common human machine interface (HMI) and common file formats.

Figure 1:
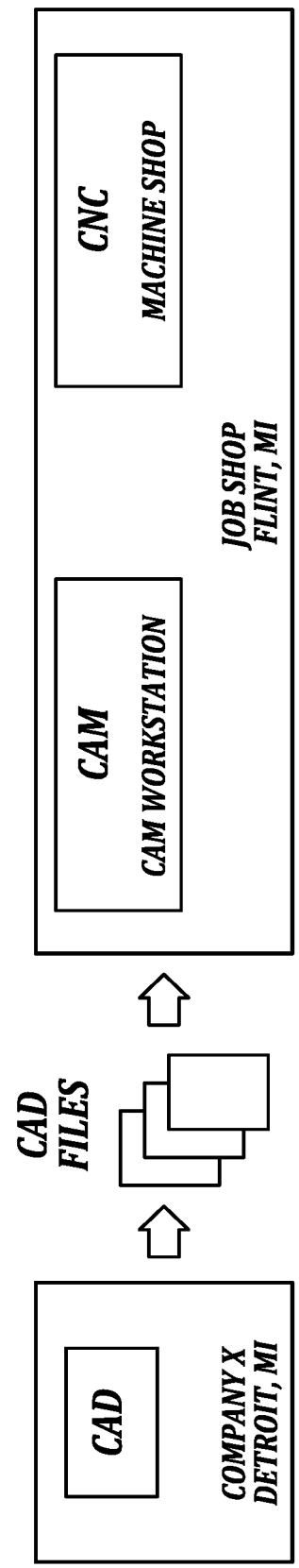
FIG. 1 is a conventional workflow process for producing a machine part with a machine tool.

Before a more detailed description of the integrated solution of the present disclosure, and in order to fully appreciate the capabilities of the presently provided integrated solution, a conventional CAD/CAM/CNC workflow will now be described in some detail with reference to FIG. 1. Phases of the workflow are currently carried out in discrete geographical locations, often separated by tens, hundreds, or even thousands of miles.

A typical workflow begins by identifying a machine part to be produced by the machine tool. Typically, the machine part to be produced by the machine tool is first designed with the assistance of CAD. CAD is the process of designing a 2D or 3D part or a collection of 3D parts which combined result in a finished mechanical assembly. Increasingly, mechanical design is done in a 3D CAD system, such as SolidWORKS, which is displayed and manipulated on screen as solid models. Currently, a company, such as an after-market engine parts manufacturer, employs an in-house CAD technician or engineer to design the machine part or assembly. An example of a machine part to be designed by such a company is a mounting plate for a cylinder head of an internal combustion engine. This company can be located, for example, in Detroit, Mich.

Once the machine part has been identified, a digital file or model of the part must be obtained. Accordingly, a digital model, such as a CAD solid model (3D) or CAD surface model (2D), is obtained of the mounting plate to be machined by the manufacturer. The digital model may be obtained in a number of ways. For example, the digital model may be obtained by the manufacturer's CAD technician using a CAD software program to generate a solid model of the mounting plate according to various geometric parameters. Alternatively, the CAD operator can obtain the digital model from a data store, which stores one or more CAD models of mounting plates for cylinder heads of standard gas and diesel engine blocks, such as V6s, small block V8s, big block V8s, inline 4s, 6s, etc., from original equipment manufacturers (OEMs), such as Ford, GM, Caterpillar, Cummins, Detroit Diesel, etc. This data store may be associated with the CAD system or part of a third-party system, such as one associated with the specific OEM.

Depending on how the model was obtained, changes can be made to the mounting plate design by the CAD technician. For example, the CAD technician or the like can interactively modify the digital model via CAD software in order to alter the geometry of one or more portions of the mounting plate, such as the size or locations of the mounting holes. Once the CAD technician is satisfied with the digital model, the digital model is saved as a part file according to a specific file type associated with that specific CAD program.

Once the machine part has been designed in the CAD system, the after-market engine parts manufacturer usually contracts out to a contract manufacturer with CAM and CNC experience, such as a job shop, since the machining of parts requires too much specialized knowledge with too many complex steps for the typical manufacturer to handle. Therefore, the manufacturer will transfer the 3D CAD solid model parts file to the job shop, which will then use their CAM/CNC skills and equipment to create toolpaths for and make parts with a machine tool. As a result, CAM systems are the interface between the CAD design phase, i.e., the geometric design of the machine part, and the CNC machine specifications. These job shops can be located in diverse geographic locations, usually at a location that is physically different from the CAD technician or engineer that designed the machine part. In the example described herein, the job shop is located in Flint, Mich.

CAM is the process of placing toolpaths on the CAD geometry. The CAD part file is imported from one of the dozen major CAD programs using one of a number of file formats. Once imported into the CAM software, the CAM operator uses the CAM software to generate toolpaths according to parameters such as the specific CNC machine, tools and material to be used in machining the designed machine part. Generally, a toolpath is the path that a cutting tool follows to machine the physical machine part during the CNC process.

Calculating toolpaths can be a computationally intensive and difficult to process. There are many different methods that can be used, depending upon the material process e.g., milling, drilling, etc., and the task at hand. The types of tools, feed rate and rotation speeds are selected during this process. Accordingly, the CAM software can include a speeds and feeds calculator, based on knowledge of the workpiece material, types of tools and machine capabilities to be used for the machining process. The CAM software also allows for modification of the toolpath by the CAM technician. Toolpath cycles are then selected based on the CAM programmer's experience and application. There are dozens of types of toolpath cycles each designed for a specific use.

Once this CAM process is complete, the generated toolpaths must be converted into instructions that can be understood and carried out by the CNC for producing the machine part. A CNC machine typically operates based upon a text-based program file or "GCode program." "GCode programs" are programs in a machine language that are generated by conventional CAM systems. GCode files are typically either manually coded by a computer aided manufacturing (CAM) technician or generated by a CAM software program or both. If using CAM software, the generated toolpaths are "post processed" into a GCode file. Such GCode files typically include a list of instructions (each instruction line being considered a block) identified as G-codes along with various associated parameters in ASCII format. Post processing can also generate MCode files as well. M-codes refer to the standard machine codes that are normally used to represent instructions such as spindle on, tool change, coolant off, etc., whereas a line of G-code can instruct a machine tool to do one of several things such as component movements, drilling, etc. During the conversion process, the generated toolpaths are converted into software codes that are specific to the CNC where the part will be produced. There are hundreds of slightly different code file formats for all the different major machine tool builders.

When a GCode file(s) is imported to a particular machine tool, the contents of the GCode file(s) provided to the CNC may be further edited to suit the particular application or machine tool. This custom editing is done on the actual CNC HMI interface and typically is limited to simple changes such as feed rate and spindle speed. Rarely are changes made to the toolpaths. This editing process is time consuming for small GCode files and impossible on larger GCode files because this requires individual G-code line by line changes. If these changes are required as permanent changes, they must be manually reconciled in the CAM software or the changes are not reflected if/when the GCode file is re-posted in the future with other changes or for other CNC machines. Again, the exported GCode file from the CAM system is in a different file format as the CAM files and the CAD files.

Once completed, raw material stock is secured by a fixture of the machine tool and is registered relative to the orthogonal coordinates of the machine. The machine tool can then be instructed by the CNC to produce the machine part by a "cycle start" command. Prior to initiating the cycle start, a tool changer portion of machine tool if so equipped may be loaded with the cutters specified in the GCode file in order to carry out the specific machine instructions of the GCode file. During this step, the operator generally checks the GCode file for reasonable feed rates and spindle RPMs. If problems appear, the operator is sometimes required to manually edit the GCode file, although this is generally disfavored by the CAM program because manual changes to GCode are not reflected back to the CAM programming process.

The workflow just described is not without its problems, which arise throughout all phases of the workflow. For example, during the CAD design phase, oftentimes little thought is given as to how parts will be manufactured. Often, the design engineer can produce parts that are impossible to manufacture for a variety of reasons, such as areas that cannot be reached with a cutting tool. This is often not detected until the design is imported into the CAM process or even worse, the CNC process. The longer these issues go undetected, the more expensive they are to recover from.

Additionally, there are a dozen major CAD software packages and dozens of less common CAD packages. Each CAD package natively stores data in its own native file format. All CAD packages can export to a few standardized neutral file formats which can be read in by CAD or CAM software. This conversion process can be problematic because all the different file formats contain different types of data. Exporting and importing between various software packages is a complex translation process, resulting in some of the information associated with the CAD design getting lost or corrupted.

Further, CAD parts are typically built using a series of operations. Once these operations are complete, the CAD part is updated to reflect the operation. As more operations are performed, the CAD part is continually refined until it meets its intended purpose. However, traditional CAD software stores the CAD geometry after the last operation was performed. This means the sequence of operations performed to achieve the finished parts is not stored, and unknown once the part is complete. This limits new CAD operators from understanding the sequence and operations performed and may even limit the original CAD operator as well. This architecture also prevents changes to operations other than the final operation performed.

Since the machining of parts requires a tremendous amount of specialized knowledge and capital investment, manufacturers typically hire a machine shop, sometimes referred to as a job shop, to carry out the machining of the design parts. Therefore, the manufacturer will transfer the CAD 3D solid model part file to a job shop at a discrete physical location, which then uses their extensive CAM/CNC skills and equipment to create toolpaths for and make parts with a selected machine tool. As a result, there is significant amount of pricing, delivery time and technical details discussed during this subcontracting process. Subcontracting is therefore expensive and creates long time delays for manufacturers.

Often the CAM process appears to be programmed correctly, but may not work well during the CNC process for a variety of reasons and oversights. In this case, the CNC operator must report the problems and may recommended corrective actions to the CAM programmer, who will then make changes that will be sent back to the CNC and tested again. This causes inefficiencies and time delays. Often, CNC operators detect a problem and attempt to continue rather than correct these issues to avoid time delay. This often leads to broken tools, broken parts and safety hazards.

Some CAM systems provide opportunities to verify the machining part program before it is sent on to the CNC machine via simulation techniques. The disadvantage of this approach is that because there are so many CNC parameters to be set, one may never be sure if the simulation is truly identical to the CNC on the machine. Therefore, a verified off-line simulation may still cause problems when executed on a particular CNC machine.

The CNC phase also has its unique problems. Each part to be machined requires a unique way to hold that part while the CNC cutting process is performed. Often the holding mechanism requires a complete design to manufacture a fixture which requires all three of the above processes to produce a fixture. The CNC operator must also properly specify the same tools that were used in the CAM process. If the CNC operator purposely or accidently attempts to use a different type of tool than was programmed in the CAM process, this often results in damage to the part, broken tools or a safety hazard.

Further, if the machine tool operator desires to make changes to the GCode file and then execute the program, the CNC machine is first stopped, then the GCode file is loaded into memory, and finally the machine is re-started. In the case of multiple machines running the same processes, the updated part program needs to be loaded into each CNC machine. The part program may also need modification by the CAM programmer, causing delays in the process.

As can be recognized from the above, CAD, CAM, and CNC are presently distinct independent technologies, processes, and programs each with very different objectives, requirements, user interfaces, and file types. Each CAD, CAM, CNC phase requires separate systems and skills that are difficult, often requiring long learning curves. This has resulted in an inefficient, complex, and expensive business model for producing parts with machine tools. Moreover, the complexity and variety of existing distinct CAD and CAM systems all using different user interface concepts and file formats has created a very large barrier to entry for manufacturers.

Towards that end, and as will be described in more detail below, the integrated solution according to embodiments of the present disclosure aims to address some if not all of the problems of prior art workflows. The resulting system is naturally integrated with the rest of the machine tool, which eliminates file handling exporting and importing time and confusion. The data is naturally consistent, handled throughout the process in its native format, and is always synced.

By combining CAD, CMM (optional), CAM and CNC processes into one software implementation attached to the machine tool, a change can be made to any of these separate processes throughout the entire manufacturing lifecycle. This decreases the time from concept to a finished machine part in a variety of ways. As will be described in more detail below, CAD can be in 2D or 3D geometry, and either imported from external CAD packages, such as SOLID-WORKS®, or created directly in the integrated solution of the present disclosure. CAM toolpaths are created directly from the selected CAD geometry. The HMI contains a "Cycle Start" button which starts the machine operating any CAM toolpaths that are currently displayed on the display. This unification of each process allows for an interactive manufacturing lifecycle where CAD, CAM and CNC processes can be built simultaneously with consideration to how these processes affect one another. Moreover, in some embodiments, a change during one process will be automatically populated to the other processes.

For example, if the geometry of the machine part is changed in CAD, the CAM toolpaths are updated automatically to reflect the changed CAD geometry and the CNC can be instantly operated by pressing "Cycle Start". Further, the CAM system and CNC system naturally use the same table of tools and both know which tools are loaded into the tool changer magazine. This drastically reduces broken tools or damage to the part to be machined.

With the integrated solution of the present disclosure, transitioning from one process to another does not require changing software packages or even saving and loading files. By eliminating file handling, errors and time are reduced. Additionally, if the operator detects an issue during the CAM or CNC process, corrective action in the preceding process also does not require changing software pages or file handling. This leads to a more integrated design and manufacturing lifecycle as each process is not independent, but instead is directly connected to its parent or sibling process. Further, setup systems are unified instead of duplicated. For instance, the table of tools is stored one time rather than duplicated in both CAM and CNC. This eliminates the possibility of mismatching tools or other settings.

If equipped, reverse engineering using the machine tool (CMM) is greatly enhanced using the architecture of the present disclosure because coordinates can be directly used to aid in building the CAD design. For example, a touch or scanning probe can be placed in the spindle of the machine tool and can automatically digitize a 2D planar profile or a 3D surface. This information from the probe can directly create CAD geometry in the integrated solution of the present disclosure. This eliminates manual point by point reverse engineering and enables automatic probe based reverse engineering of complicated shapes and parts.

The file format of the CAD part file of the integrated solution does not save final CAD geometry. Instead, embodiments of the integrated solution save the series of operations used to produce the intended CAD part. Each operation can be temporarily turned off and the parts graphics are updated to reflect removing the operation. This allows anyone to understand the exact sequence of operations that were originally used to produce the CAD part. It also allows properties in each operation to be changed even after other operations follow. For instance, a fillet radius can be changed which may affect operations following the fillet radius operation.

In the following detailed description of embodiments of the present disclosure, numerous specific details are set forth in order to provide a thorough understanding of one or more embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 2:
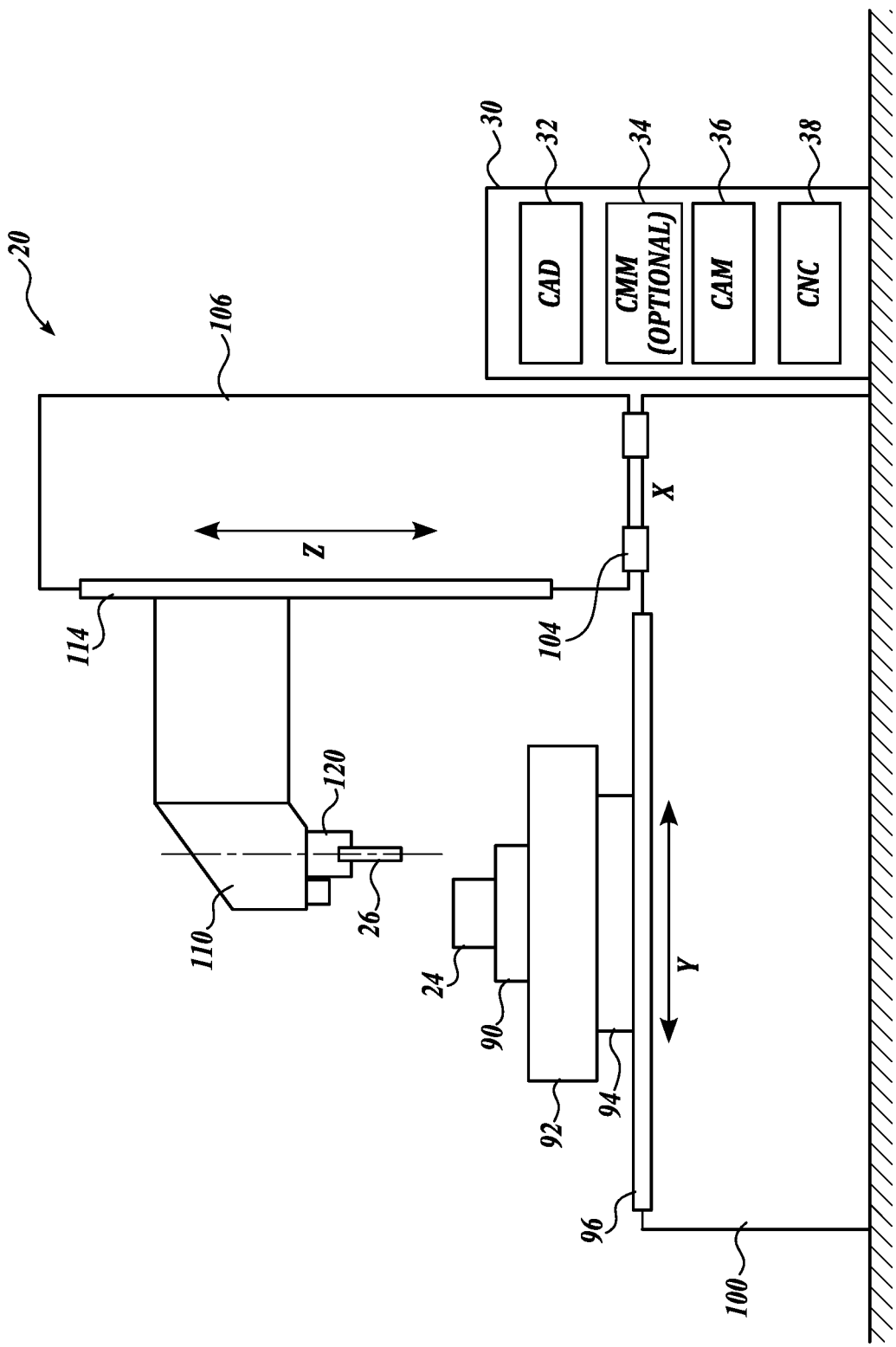
FIG. 2 is a schematic representation in side view of one representation of a machine tool that incorporates an embodiment of a C4 system in accordance with an aspect of the present disclosure.

FIG. 2 schematically illustrates one embodiment of a machine tool 20 for machining a workpiece 24 with one or more tools 26 selected from a magazine or table of tools 28

Figure 4:
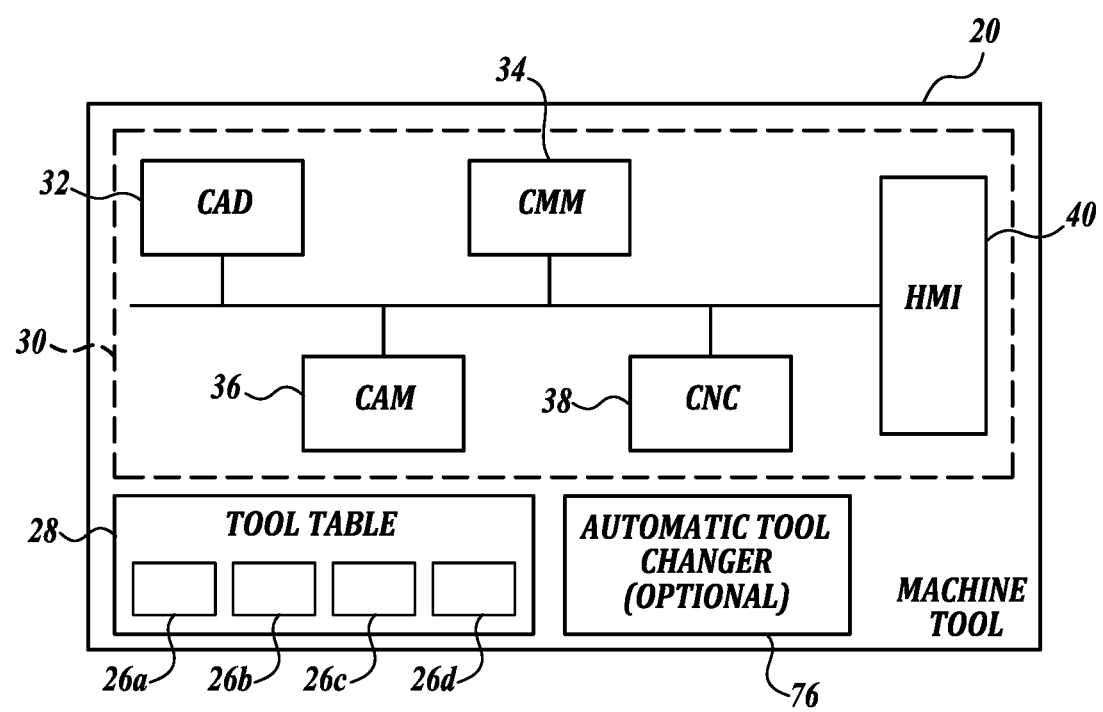
FIG. 4 is a block diagrammatic representation of one embodiment of the machine tool of FIG. 2.
Figure 24:
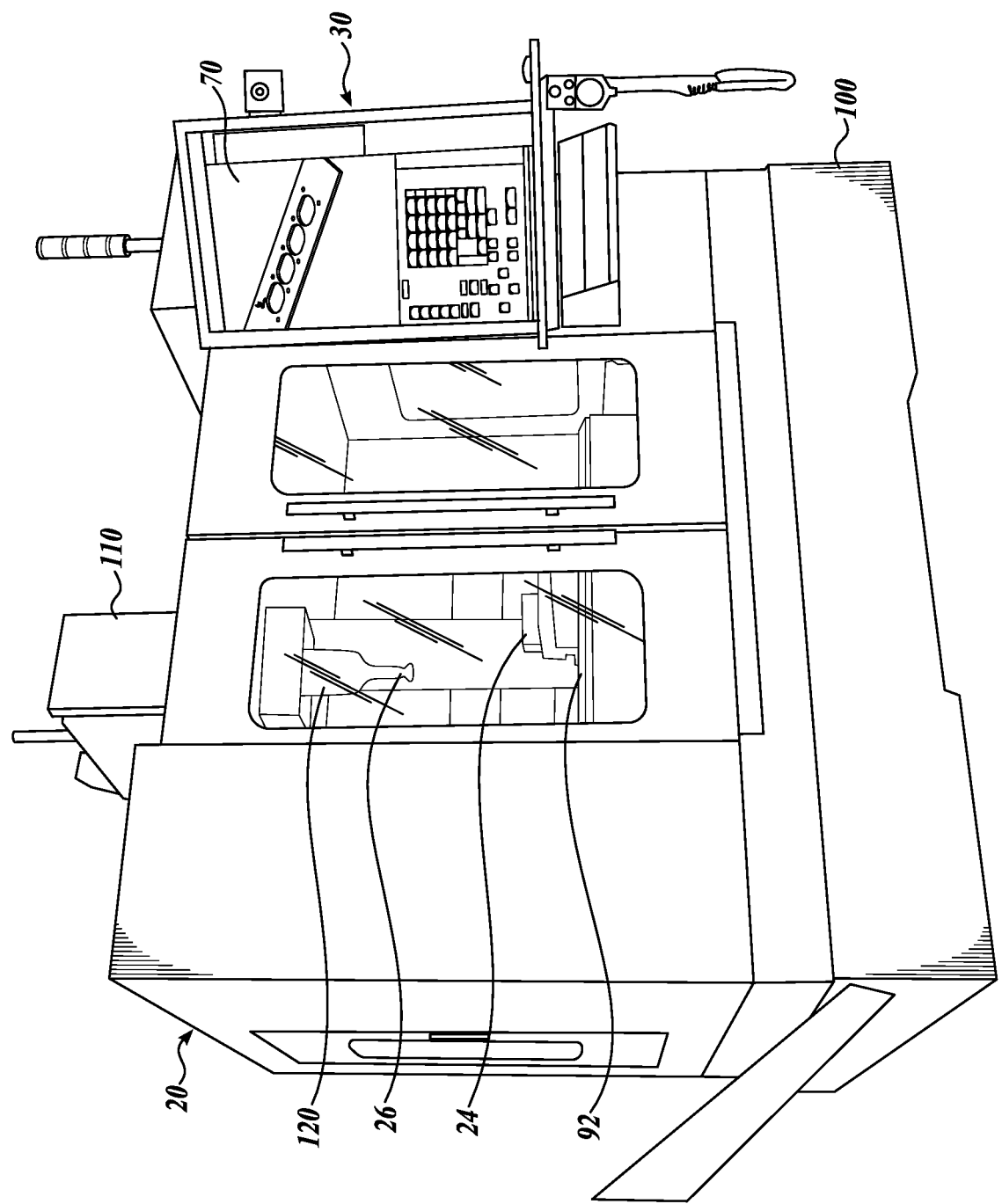
FIG. 24 is a schematic representative of one embodiment of a workstation that integrates a machine tool and the C4 system of FIG. 3.

(FIG. 4). FIG. 4 is a block diagram of the machine tool 20 of FIG. 2. In order for this to happen, the machine is controlled by an integrated hardware and software system 30 having CAD/CMM (optional)/CAM/CNC capabilities in accordance with an aspect of the present disclosure. These capabilities include CAD 32 functionality to design and edit a machine part in accordance with various geometries, CMM 34 functionality to reverse engineer the design from an existing part, and CAM 36 functionality to develop and edit toolpaths based on the CAD design. The system 30 further includes CNC 38 functionality for operating a number of servos with positional feedback in order to carry out, for example, up to 5-axis or more machining of the workpiece 24. A common human machine interface (HMI) 40 allows a technician to interact with the system 30. The system 30 having these capabilities will now be referred to as a C4 system. The C4 system is mounted to, supported by or position next to (e.g., from a few inches to a couple of feet) or otherwise integrated with the machine tool 20. The machine tool 20 with integrated, computer based system 30 is sometimes referred to herein as a "workstation" or "C4 workstation." One example of a workstation according to an embodiment of the present disclosure is depicted in FIG. 24.

Figure 3:
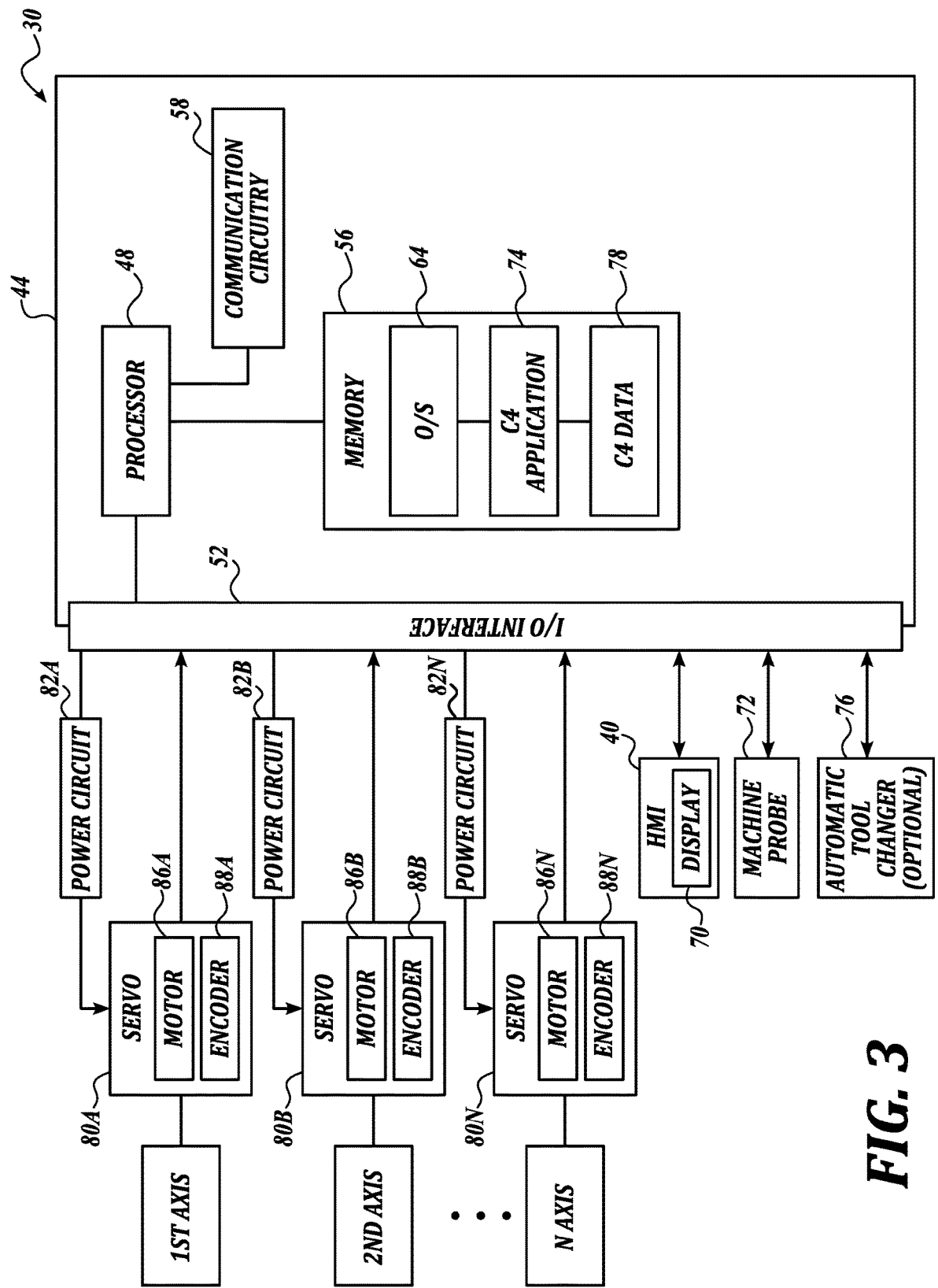
FIG. 3 is a block diagram of one representative embodiment of a C4 system in accordance with an aspect of the present disclosure.

Turning now to FIG. 3, there is shown a block diagram of a representative component architecture of one example of the C4 system 30. The system 30 includes a computing device 44 composed of hardware components, such as a central processing unit (CPU) or processor 48, I/O interface 52, and memory 56 suitably interconnected via one or more buses. Optional communication circuitry 58 may be included in order to import data to and/or export data from the system 30. Depending on the exact configuration and type of computing device, the memory 56 may include system memory in the form of volatile or nonvolatile memory, such as read only memory ("ROM"), random access memory ("RAM"), EEPROM, flash memory, or similar memory technology. Those of ordinary skill in the art and others will recognize that system memory typically stores data and/or program modules that are immediately accessible to and/or currently being operated on by the processor 48. In this regard, the processor 48 serves as a computational center of the computing device 44 by supporting the execution of instructions.

The memory 56 may also include storage memory. The storage memory may be any volatile or nonvolatile, removable or non-removable memory, implemented using any technology capable of storing information. Examples of storage memory include but are not limited to a hard drive, solid state drive, CD ROM, DVD, or other disk storage, magnetic cassettes, magnetic tape, magnetic disk storage, and the like. The information stored in the storage memory includes but is not limited to program modules and data to be accessed by the processor 44. Generally, program modules may include routines, applications, objects, components, data structures, etc., that perform particular tasks or implement particular abstract data types. It will be appreciated that system memory and storage memory described herein are merely examples of computer readable storage media.

In the embodiment shown in FIG. 3, the memory 56 stores an operating system 64 for controlling the operation of the computing device 44. In one embodiment of the disclosure, the operating system 64 provides a graphical operating environment, such as Microsoft Corporation's WINDOWS®, LINUX, Google's Android or Google's Chrome graphical operating system, etc., in which activated applications or program modules are represented as one or more graphical application windows with an interface visible to the user, such as a graphical user interface (GUI). Generally, the computing logic can be stored on any type of computer-readable medium (e.g., a non-transitory medium such as a memory or storage medium) or computer storage device and executed by one or more general-purpose or special-purpose processors, thus creating a special-purpose computing device configured to provide functionality described herein.

To interact with the computing device 44, the input/output interface 52 may include or interface with a variety of components that enable the computing device 44 to obtain inputs from and provide outputs to a user and/or other devices, including the machine tool 20. For example, the input/output interface 52 may form part of the HMI, and include, but is not limited to, a display 70, such as an LCD, an LPD, OLED display, etc., a keypad, hard or soft keyboards, a touchpad, controls, physical buttons, scroll wheels, a digital pen, trackballs, a joystick, etc. In one embodiment, the display 70 may be configured as a touchscreen.

The memory 56 also stores a C4 application 74 that when executed by the processor 48, provides CAD/CMM (optional)/CAM/CNC functionality to the system 30. To that end, the C4 application 74 may include one or more applications or program modules, which can be written in a programming language, such as C, C++, COBOL, JAVA™, PHP, Perl, HTML, CSS, JavaScript, VBScript, ASPX, Microsoft.NET™ languages such as C#, and/or the like. It will be appreciated that the functionality of the C4 application 74 may be split among multiple program modules or sub-modules.

As will be described in more detail below, execution of the C4 application 74 by the processor 48 in some embodiments generates one or more user interfaces having one or more interface elements. In some embodiments, the one or more user interfaces are presented to the user via the display 70 by a number of "windows", each having a number of controls, such as menus, submenus, etc., arranged in a hierarchal manner. In some embodiments, the user may toggle between user interface "windows" via tabs (See FIG. 14). The memory 56 also stores C4 data 78 for use by the C4 application 74, such as tool libraries with feed and speed rates, a list of tools that has been loaded into an optional automatic tool changer, optional g-code libraries, unit conversion libraries, product designs, etc. Of course, the memory 56 can store any information that can benefit the machining of a part as carried out by operations of the C4 application 74.

For example, FIGS. 14, 15, 19, 20 and 23 illustrate examples of graphical user interfaces generated by the application 74 and rendered on the display 70. Embodiments of the application 74 may employ any number of different controls, which include but are not limited to drop-down menus, value inputs, checkboxes, buttons and other input means for entering information and data. The information and data input by the operator via the GUI "windows" are transmitted to the processor 48 for execution, etc.

Figure 14:
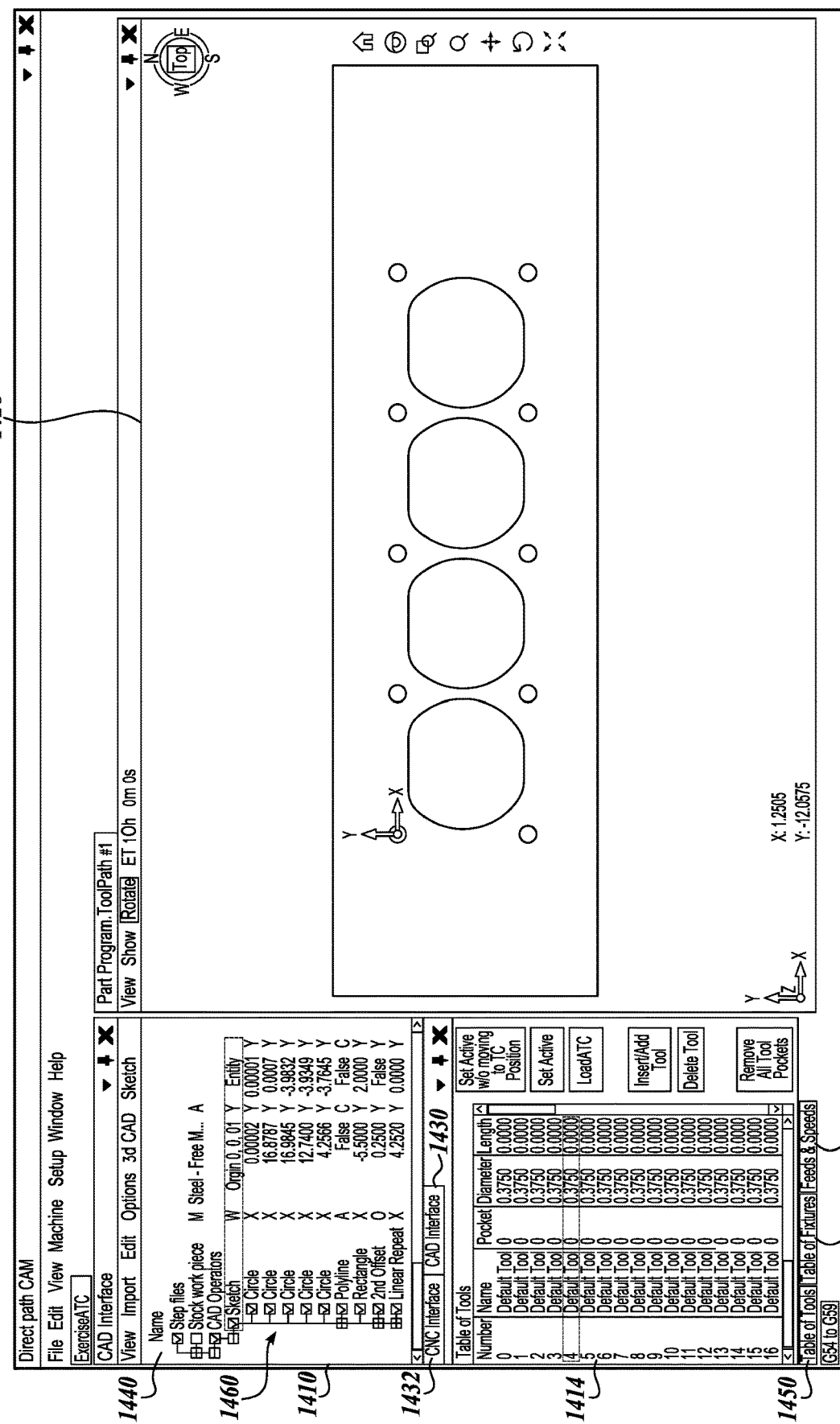
FIG. 14 is a schematic rendering of one representative embodiment of a graphical user interface (GUI) rendered by the system of the present disclosure during the CAD process, the GUI rendering a geometric representation of the measurements obtained by the measurement probe during CMM.

FIG. 14 is a schematic rendering of one representative embodiment of a graphical user interface (GUI) rendered by the system of the present disclosure during the CAD process, wherein the GUI renders a geometric representation of the measurements obtained by the measurement probe during CMM.

Figure 19:
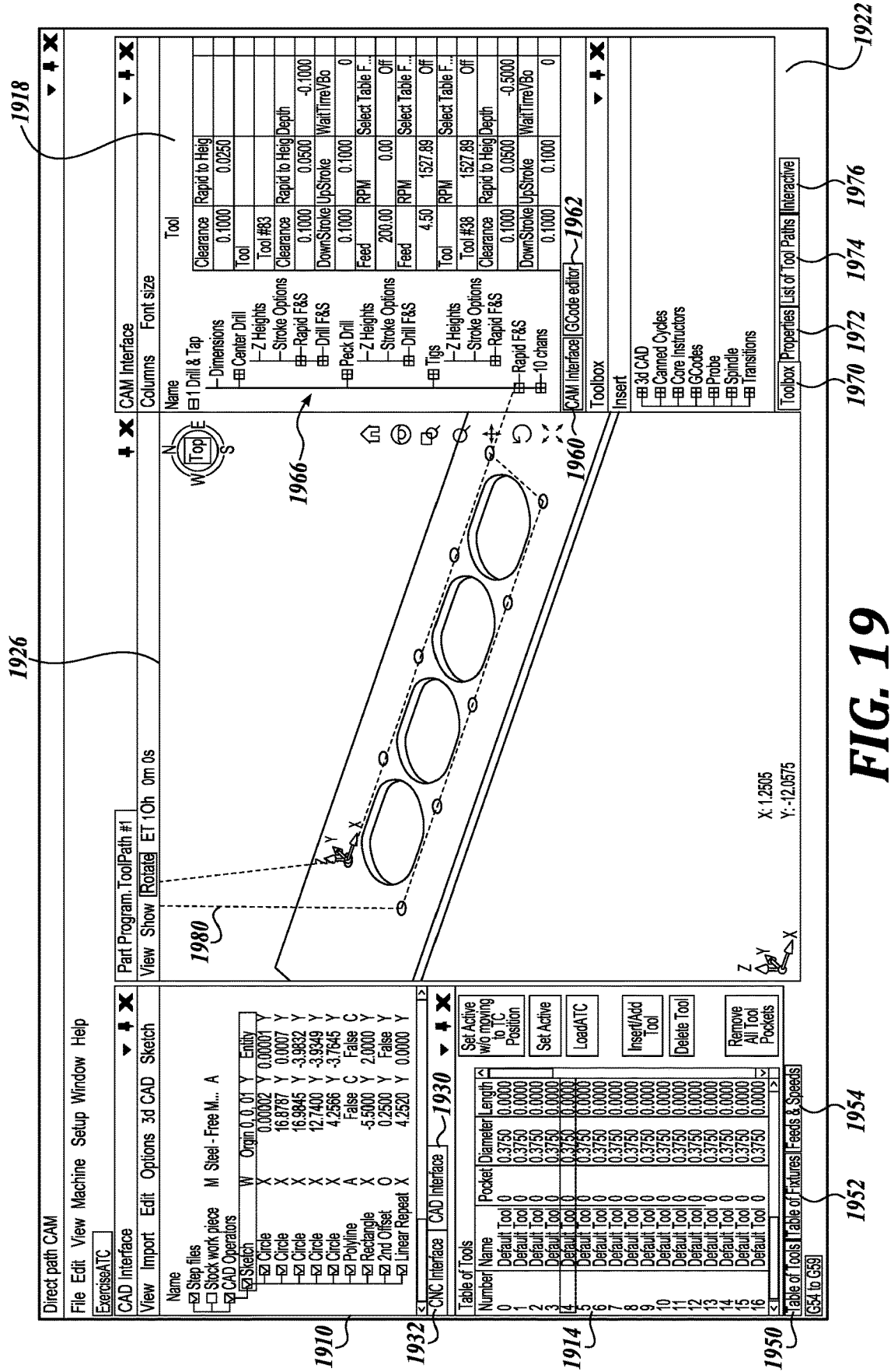
FIG. 19 is a schematic rendering of the graphical user interface (GUI) rendered during the CAM process, the GUI displaying the toolpath attributes in one window, a list of CAD operations, a list of possible toolpath functions in a separate window, a list of feeds and speeds in another window, and the 3D CAD part rendered in a central window and displaying a first generated toolpath.

FIG. 19 is a schematic rendering of the graphical user interface (GUI) rendered during the CAM process. The GUI displays toolpath attributes in one window, a list of CAD operations, a list of possible toolpath functions in a separate window, a list of feeds and speeds in another window, and the 3D CAD part rendered in a central window and displaying a first generated toolpath.

Figure 20:
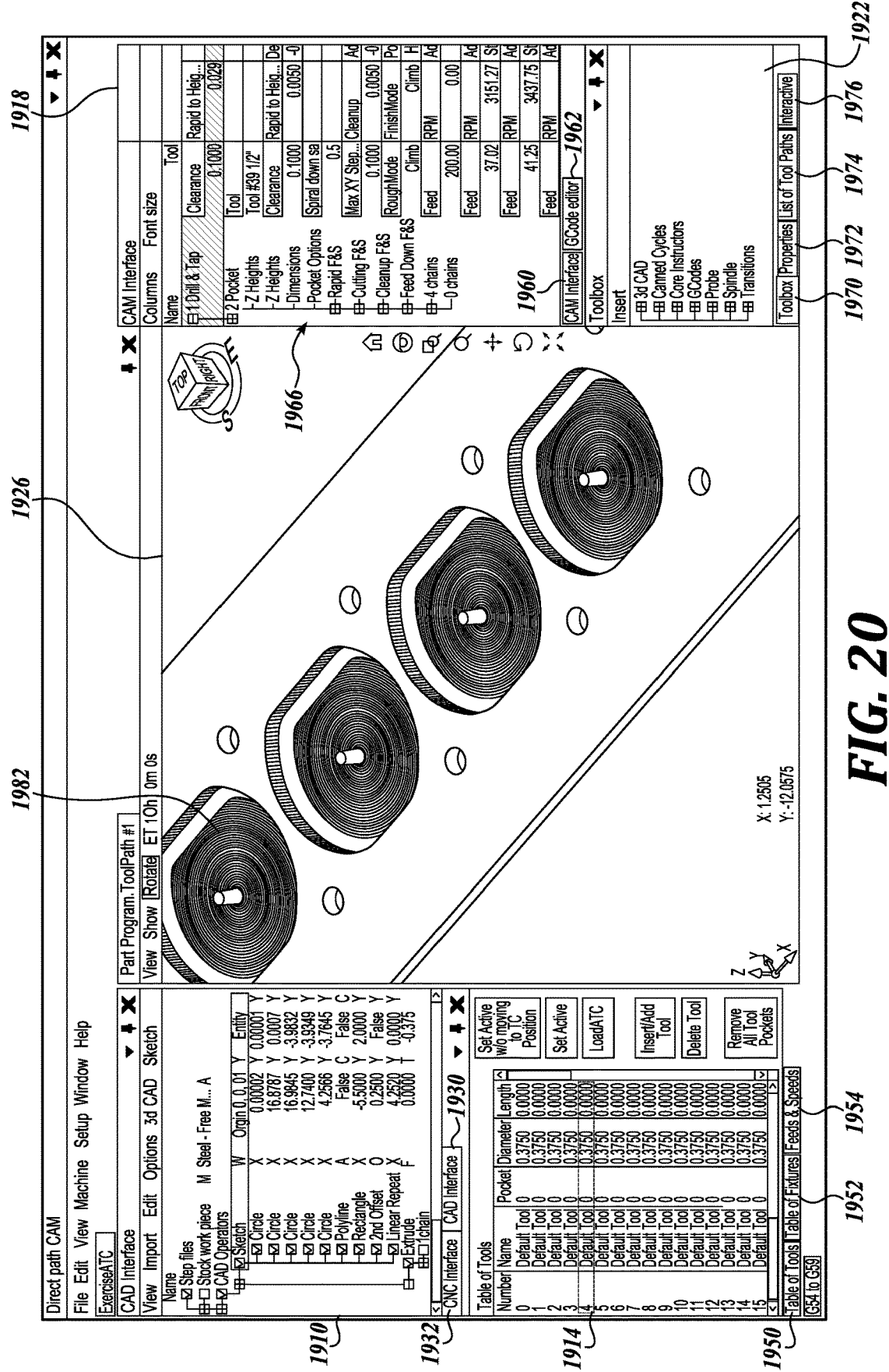
FIG. 20 is a schematic rendering of the graphical user interface (GUI) rendered during the CAM process, the GUI displaying the 3D CAD part rendered in a central window and displaying a second generated toolpath for a different section, such as the center shapes, of the part to be machined.

FIG. 20 is a schematic rendering of the graphical user interface (GUI) rendered during the CAM process. The GUI displays the 3D CAD part rendered in a central window and displays a second generated toolpath for a different section, such as the center shapes, of the part to be machined.

Figure 23:
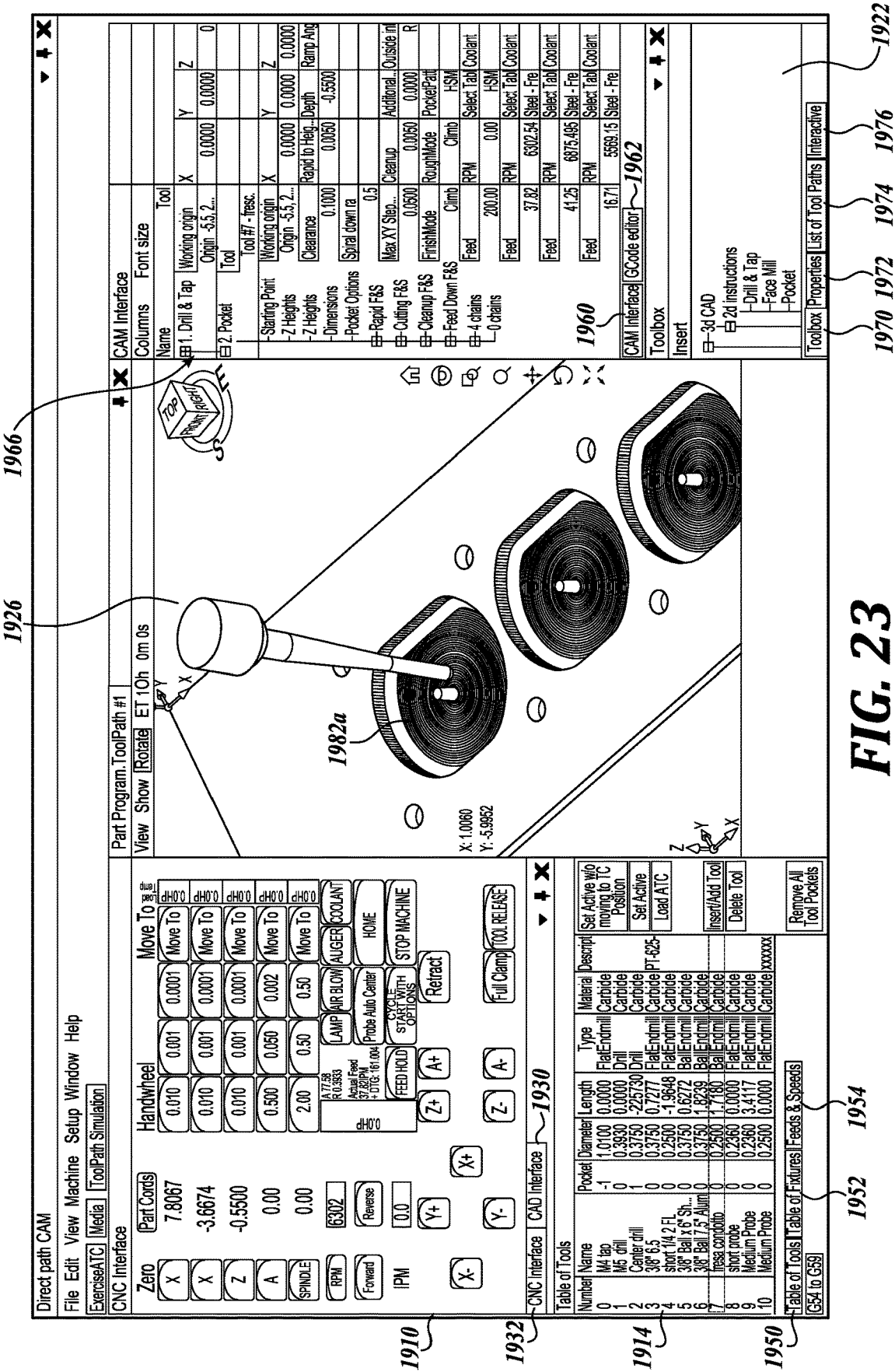
FIG. 23 is a schematic rendering of the graphical user interface (GUI) rendered during the CNC process, the GUI displaying the 3D CAD part rendered in a central window and displaying the toolpath being machined on the rendered 3D CAD part.

FIG. 23 is a schematic rendering of the graphical user interface (GUI) rendered during the CNC process. The GUI displays the 3D CAD part rendered in a central window and displays a tool following a selected toolpath as the part is machined.

The system 30 interfaces with the machine tool 20 through I/O interface 52. In one embodiment, the machine tool 20 is configured as a vertical axis machine tool. The axes of the machine tool include, for example, linear drives in the X, Y, and Z directions, and a spindle configured to rotate about the A axis via a rotational drive. Other embodiments of the machine tool may include additional axis control, such as B axis, C axis, etc., control. The machine tool includes a servo 80 corresponding to each axis of the machine tool. In that regard, the I/O interface 52 has I/O ports and/or related circuitry, which enable it to communicate with external power circuits 82. In some embodiments, one power circuit 82 is associated with each axis under the control of the system 30. Connected to each power circuit is a servo 80A-80N, each including a motor 86 which provides the driving force for the axis, and a suitable sensor 88, such as an encoder, which provides motor position and/or velocity feedback information.

In some embodiments, servo loops maybe closed by the PC CPU using interrupt initiated real time Windows standard device driver. The device driver may be given highest priority by Windows OS settings. The device driver may store variables into RAM for diagnostic use in event of system crash or failure or for monitoring normal or abnormal system operation.

For more information regarding one representative embodiment of how the CNC functionality can be implemented with system 30 and machine tool 20 in real time, please see U.S. Pat. No. 5,926,389, which is incorporated by reference in its entirety herein.

The machine tool 20 further includes a chucking fixture 90 to hold or clamp down the workpiece 24 on the table 92 of the machine tool 20 so as to be stationarily fixed thereto. The table 92 can be displaced by a carriage 94 on Y guide rails 96 mounted on a machine bed 100 of the machine tool 20 in the Y direction along the Y guide rails 96 by a Y feed axis. Furthermore, X guide rails 104 oriented in the X direction and extending perpendicularly to the Y direction are mounted on the machine bed 100 of the machine tool. A machine column 106 is disposed on the X guide rails 104, which can be displaced in the X direction along the X guide rails 104 by an X feed axis. Of course, in other embodiments, the table 92 may be configured as an X-Y traveling table. Other configurations are possible, and thus, the embodiment illustrated in FIG. 2 is for illustration purposes only and should not be considered as limiting.

The machine tool further comprises a machining head 110 that can be displaced in the Z direction along Z guide rails 114 by a Z feed axis, the Z guide rails 114 being mounted on the machine column 106. In this case, the Z direction extends perpendicularly to the X direction and Y direction, respectively. On the machining head 110 a tool-supporting work spindle 120 is disposed which is adapted to receive and drive a tool (e.g., a drilling tool, tapping tool, milling tool, etc.) for machining the workpiece 24. In some embodiments, the machine tool 20 also includes a tool table for holding a set of tools (see FIG. 4), and automatic tool changer (see FIGS. 3 and 4) for automatically changing the tool coupled to the spindle 120.

Figure 5:
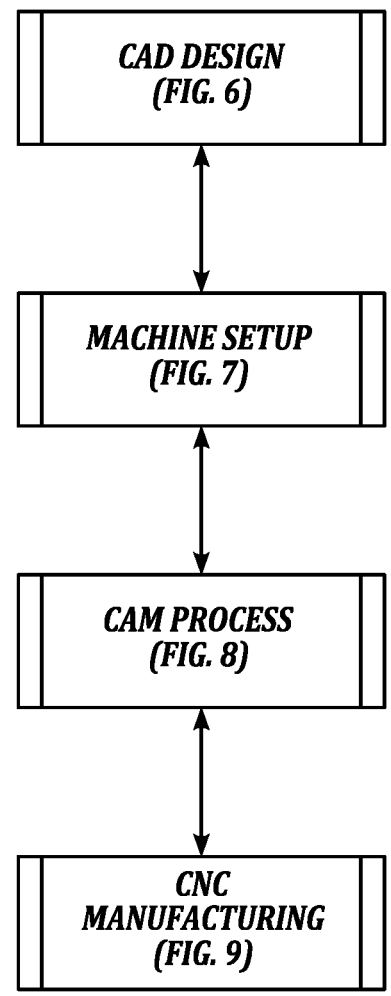
FIG. 5 is an integrated workflow process for producing a machine part in accordance with an embodiment of the present disclosure.

FIG. 5 is a work flow process 500 in accordance with one or more aspects of the present disclosure. The workflow process can be carried out with system 30 controlled machine tool 20. As shown in FIG. 5, the work flow process 500 begins with CAD design process, where a digital part file, such as a 3D solid model, is obtained of a machine part to be produced. In the example provided herein, the machine part is a cylinder head mounting plate. The digital part file may be obtained in a number of ways, as will be described in more detail below with reference to FIG. 6.

Figure 6:
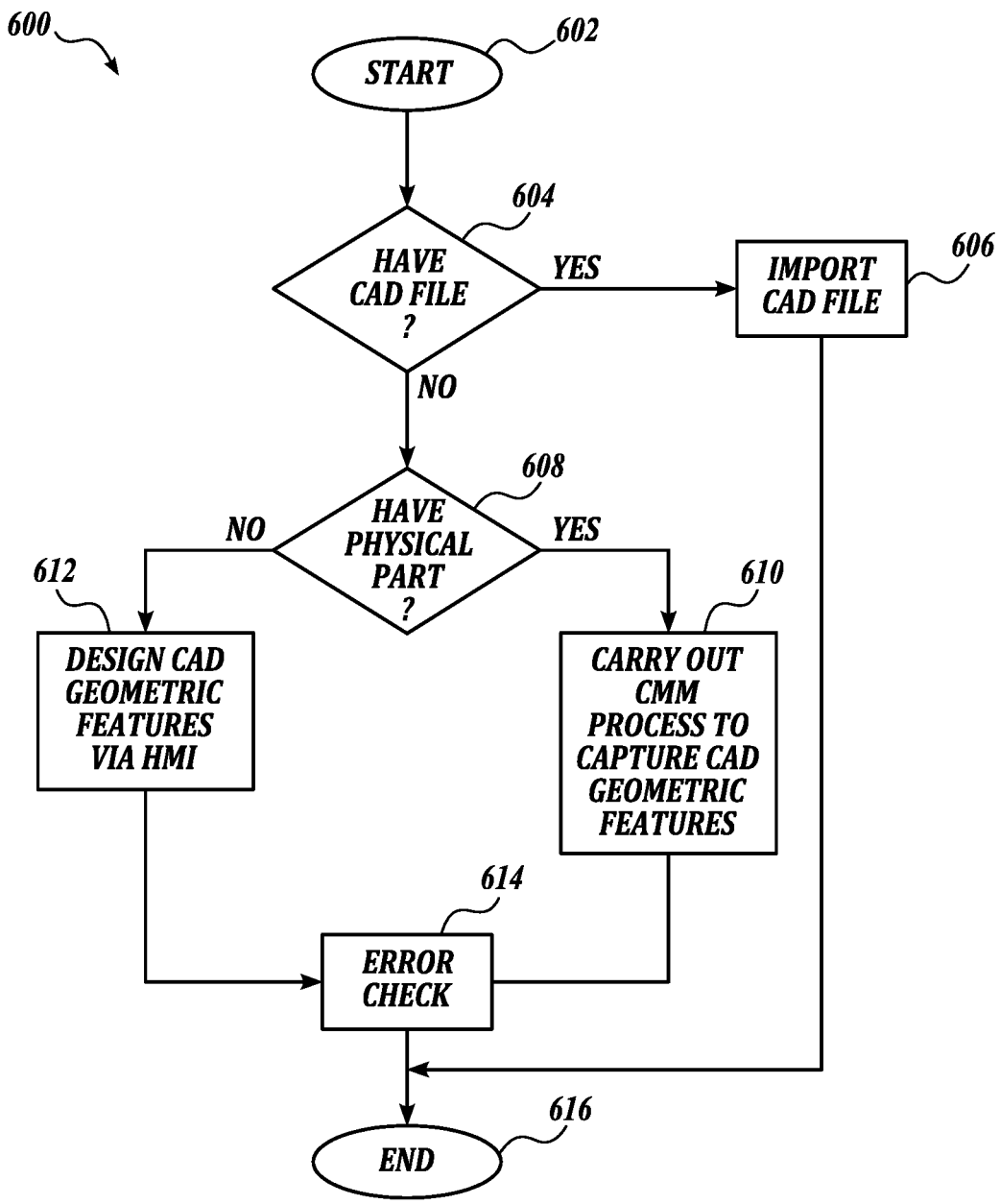
FIG. 6 is one embodiment of a routine for obtaining a CAD part file during the CAD design stage of the workflow process of FIG. 5.

FIG. 6 is one embodiment of a routine 600 implemented by the system 30 for carrying out functionality of the CAD design process to obtain a 3D digital part file. Routine 600 starts at block 602 and continues to a decision block 604. A decision is made at block 604 as to whether the machine tool technician has access to an existing CAD part file for the machine part to be produced. For example, the after-market engine parts manufacturer may already have an existing CAD part file for a cylinder head mounting plate stored in an associated data store. If the answer is yes, the routine 600 progresses to block 606, where the CAD part file is imported into the system 30, such as from the associated data store, and the routine ends. In one embodiment, the CAD part file is obtained via the communications circuitry 58.

Figure 11:
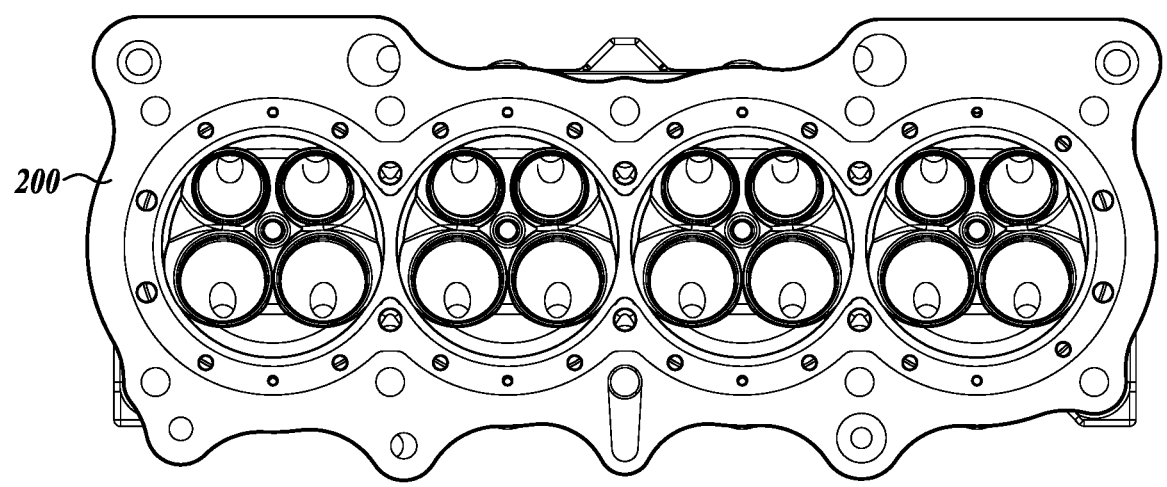
FIG. 11 is a pictorial representation of a type of cooperating machine part, such as a cylinder head, employed in CMM for obtaining CAD measurement data.

Otherwise, the routine 600 continues to another decision block 608, where a decision is made as to whether the machine tool technician has access to a physical copy of the machine part. For example, the after-market engine parts manufacturer may be in possession of a prototype of the mounting plate or may have a product from a previous project that is similar enough to the part needed. In other embodiments, the technician may instead have access to a cooperating part of the mounting plate. For example, the technician may have access to a cylinder head 200 (See FIG. 11) for which the mounting plate will be mounted.

If the answer to decision block 608 is yes, the routine 600 progresses to block 610, where the geometry of the physical part or cooperating part can be capture via CMM. For example, digital data can be obtained by measuring (e.g., scanning) the respective surfaces, openings, ports, holes, etc., of the cylinder head mounting plate for input into the C4 application. Alternatively, digital data can be obtained by measuring (e.g., scanning) the respective surfaces, openings, ports, holes, etc., of the cooperating cylinder head 200 for input into the C4 application (See FIGS. 12 and 13).

Figure 12:
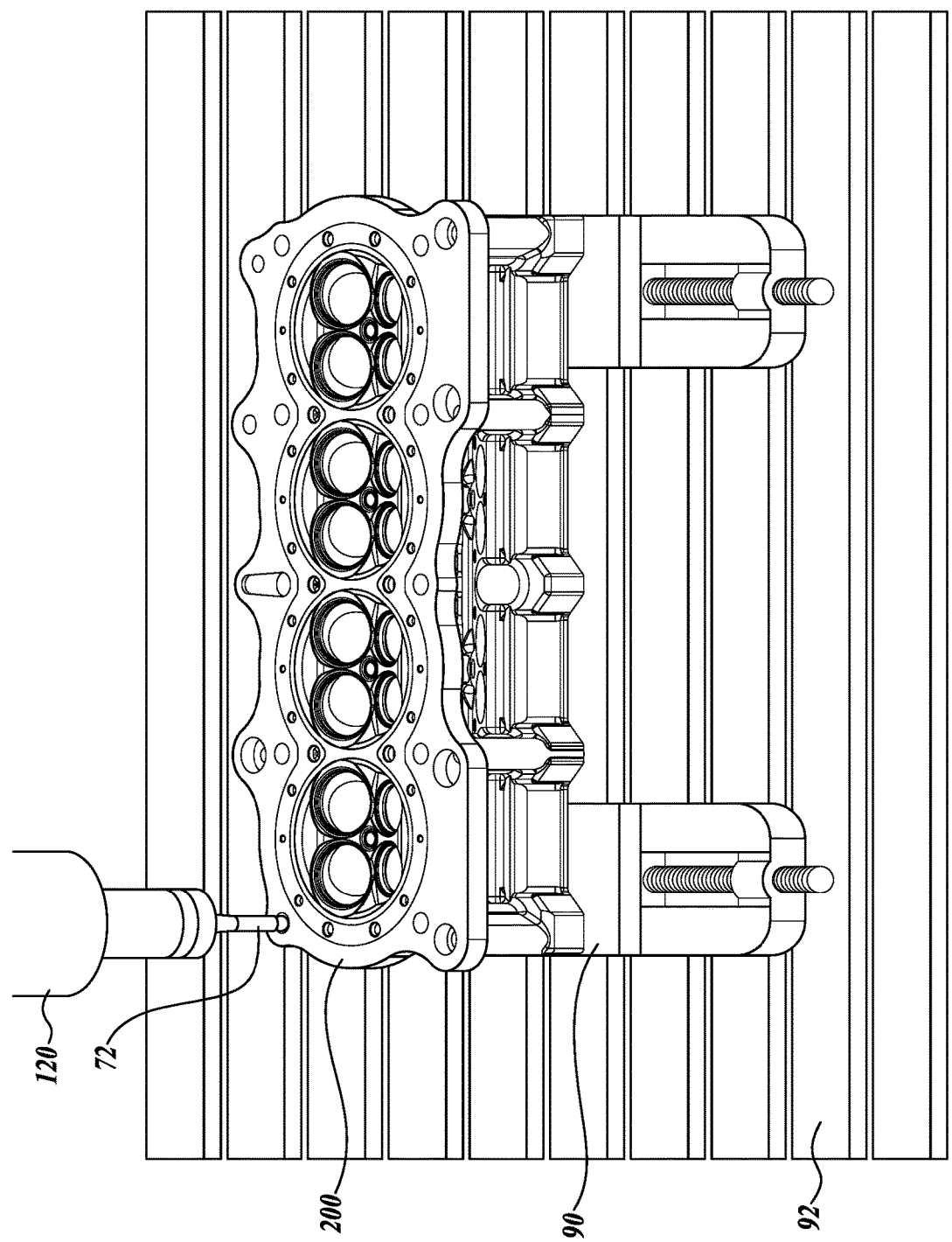
FIG. 12 is a pictorial representation of the cooperating machine part secured to one embodiment of a chucking fixture, showing a touch or measurement probe scanning a section of the cooperating part during CMM.
Figure 13:
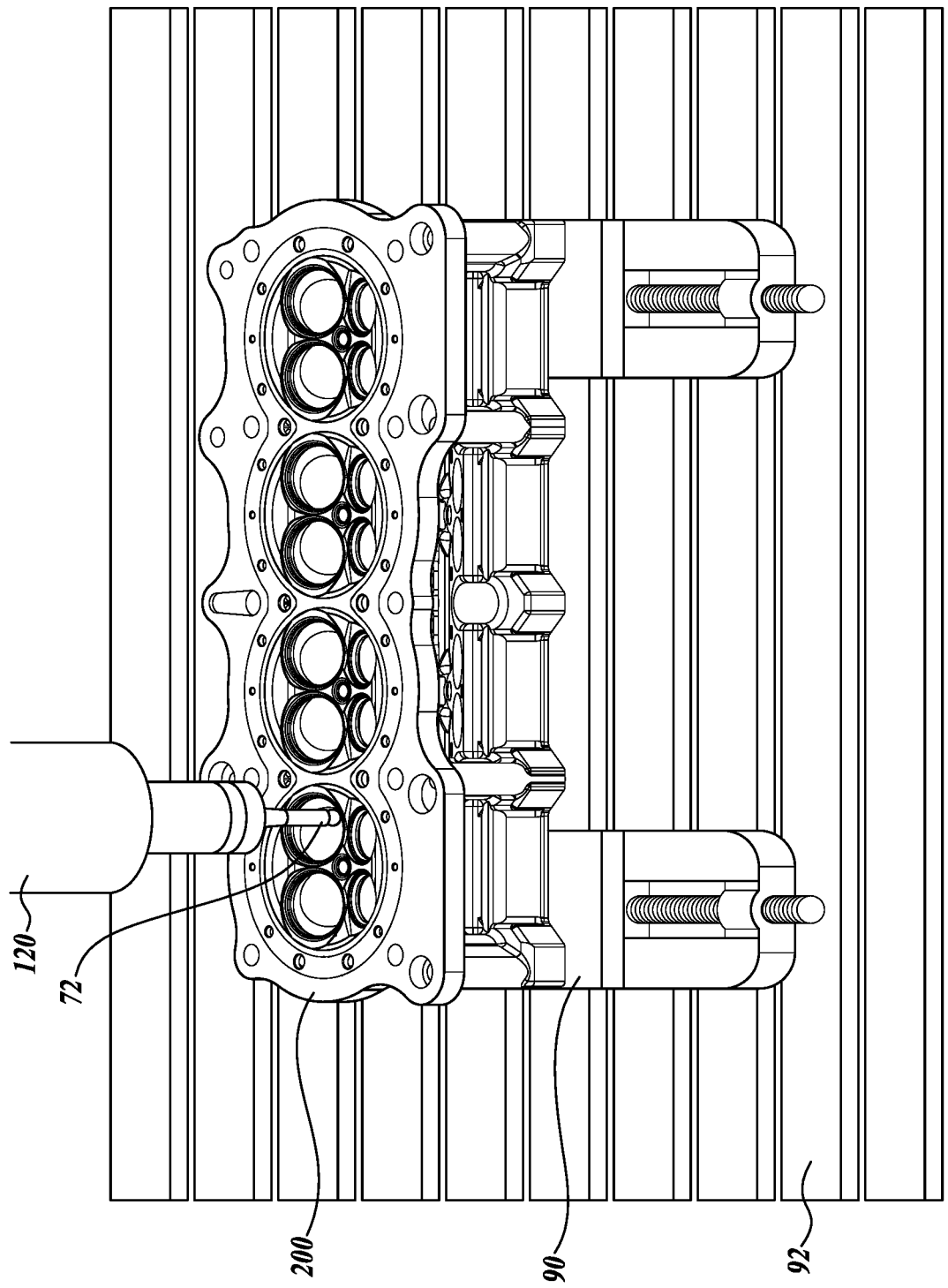
FIG. 13 is a pictorial representation of the cooperating machine part secured to one embodiment of a chucking fixture, showing a touch or measurement probe scanning a section of the cooperating part during CMM.

In order to measure a machined part or cooperating part, a scanning probe 72 can be inserted into the spindle 120 normally occupied by a cutting tool and the respective part to be measured can be mounted to the chucking fixture 90. In one embodiment, the probe 72 "finds" a reference location, sometimes referred to as the "zero" or "origin" point, such as the upper left corner of the secured part. The probe 72 is then moved under the control of the CNC portion of the system 30 about the part so that the probe's stylus tip contacts the mounted part at desired locations. As the probe 72 traverses the part, the probe 72 can automatically digitize a 2D planar profile or a 3D surface profile of the part or sections of the part, such as the combustion chamber openings as shown in FIG. 13. Other geometric attributes can be obtained as well. For example, the location of the center point of holes and the spaces therebetween can be measured, as shown in FIG. 12. This information from the probe 72 can directly create CAD geometry in the system 30, as shown in the schematic rendering of FIG. 14. This eliminates manual point by point reverse engineering and enables automatic probe based reverse engineering of complicated shapes and parts. Accordingly, the CNC control functionality of the system 30 in conjunction with the probe 72 can be used as a coordinate measurement machine (CMM). Types of scanning probes that can be practiced with embodiments of the present disclosure include probes from Renishaw, such as the Renishaw SP25M, the SP600, and the SP80.

To carry out the geometric creation of the part to be machined by either the CAD functionality of the system or generated via CMM, the display 70 renders a GUI generated by the computing system 44. FIG. 14 is one embodiment of a GUI generated by, for example, the C4 application 74, and rendered by the display 70. As shown in FIG. 14, multiple interface sections or "windows" can be employed. For example, in the embodiment shown in FIG. 14, the upper left window shows a first interface section 1410 in the form of CAD operations. This interface section 1410 includes tabs 1430, 1432, etc., for changing or toggling between a CAD Interface, a CNC Interface, and an optional CMM Interface (not shown). Alternatively, the CMM Interface can be implemented within menus of either the CAD Interface or the CNC Interface or both. In yet other embodiments, the CMM Interface is implemented in a separate window associated with the interface section 1922 (See FIG. 19).

Interface section 1410 further includes controls 1440, such as drop-down menus, value inputs, checkboxes, and other input means for entering information and data. The lower left window shows a second interface section 1414 in the form of a Tools Interface. This interface section 1414 includes tabs 1450, 1452, 1456, etc., for changing between Table of Tools, Table of Fixtures, and Feeds & Speeds. Interface section 1414 further includes controls, such as value inputs, buttons, and other input means for entering information and data, etc. Some controls in interface section 1414 may also be used to interface with the CNC devices. For example, the table of tools can control the machine's tool changer if equipped (See, e.g., load ATC button in FIG. 14). Of course, in some embodiments, the list of tools corresponds to the actual tools loaded either in the tool table 28 or the ATC 76. The generated GUI of FIG. 14 further includes a third interface section 1426 as a main central window having a number of controls, such as drop down menus, etc., for interacting with the 2D or 3D CAD part. It will be appreciated that the C4 application is configured to allow the operator to drag and drop windows to any location on the display so as to enable the operator to change the layout of the GUI according to specific preferences.

On the other hand, if it is determined that a physical copy of the machine part is not available, the routine 600 continues to block 612, where the machine tool technician creates the CAD part file within the system 30 via inputs from the HMI. In that regard, the digital part file may be created by the manufacturer's CAD technician using the CAD functionality of the system 30 to generate a 2D planar profile or a 3D solid model of the mounting plate according to various geometric parameters. In one embodiment, the system 30 is configured to track and display the creation process of the CAD part file as a list of operations 1460 in editable script, as shown in the window of interface section 1410. This allows the technician to change many design details by just changing numbers in the script. This also allows the creator to remember the process and sequence they used to create the design. The sequence of operations can be displayed in a "window" rendered by the GUI of the system 30, such as indicated as 1460 in first interface section 1410.

Figure 15:
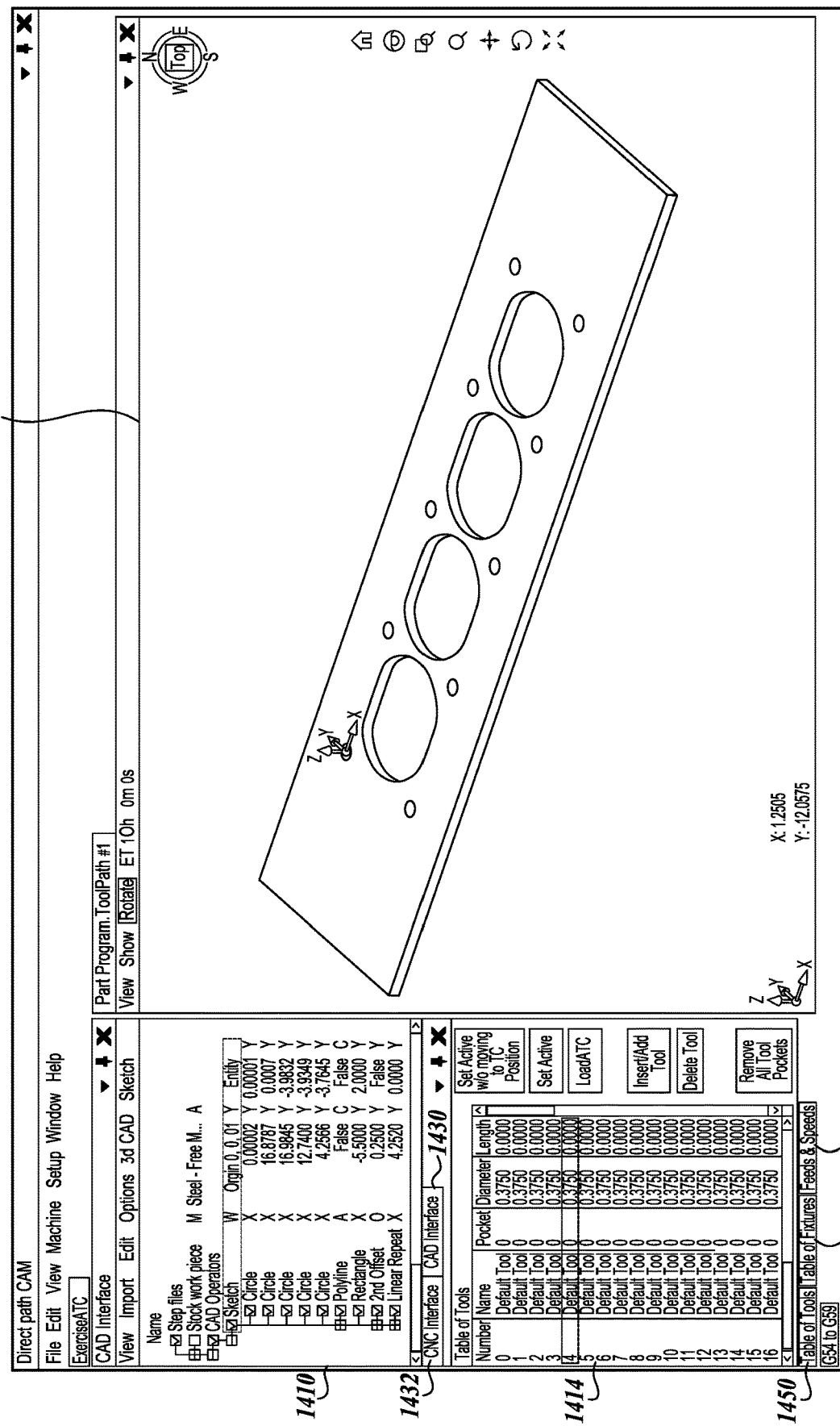
FIG. 15 is a schematic rendering of the graphical user interface (GUI) of FIG. 14 extruded into a 3D Model of a machine part to be machined, the GUI allowing manipulation and modification of the 3D model via input by an HMI.

In either case, once digital data representative of the geometry of the machine part resides in the system 30, the digital data can be viewed on display 70, such as in window 1426, and manipulated by the HMI. FIG. 15 is one example of a digital model viewable on display 70 and manipulatable within application 74 with the aid of the GUI. The CAD technician or the like can then interactively modify the digital part file via interaction with the graphical user interface, such as interface sections 1410 and 1426, in order to alter one or more attributes of the geometry of the machine part. For example, changes can be made to plate thickness, dimensioning of the mounting holes, spacing of the mounting holes, overall shape, etc.

After the optional error check at block 614, the routine ends at block 616.

Returning to the routine 500 after the CAD part file is obtained, the workflow process 500 continues to machine tool setup. Machine setup can take many forms, depending on the type of machine tool, and the specifics of the machine part to produce, as will be described in more detail below with reference to FIG. 7.

Figure 7:
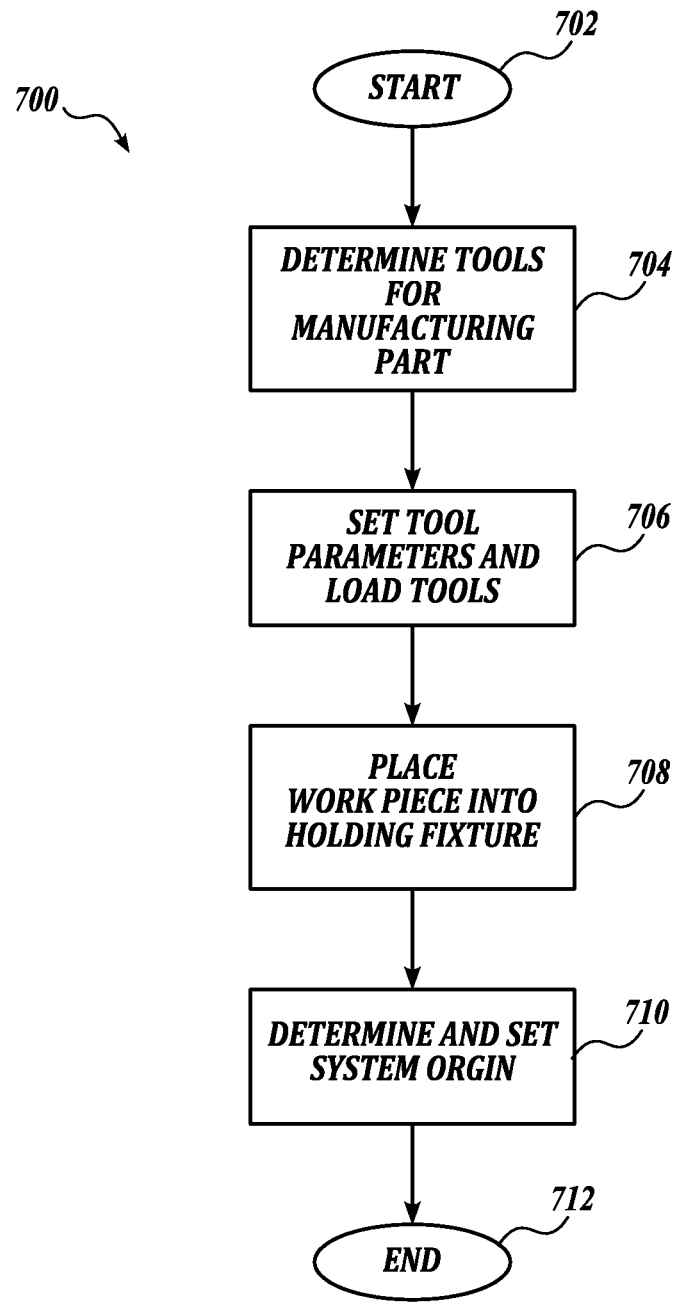
FIG. 7 is one embodiment of a routine for setting up the machine tool during the machine setup stage of the workflow process of FIG. 5.
Figure 16:
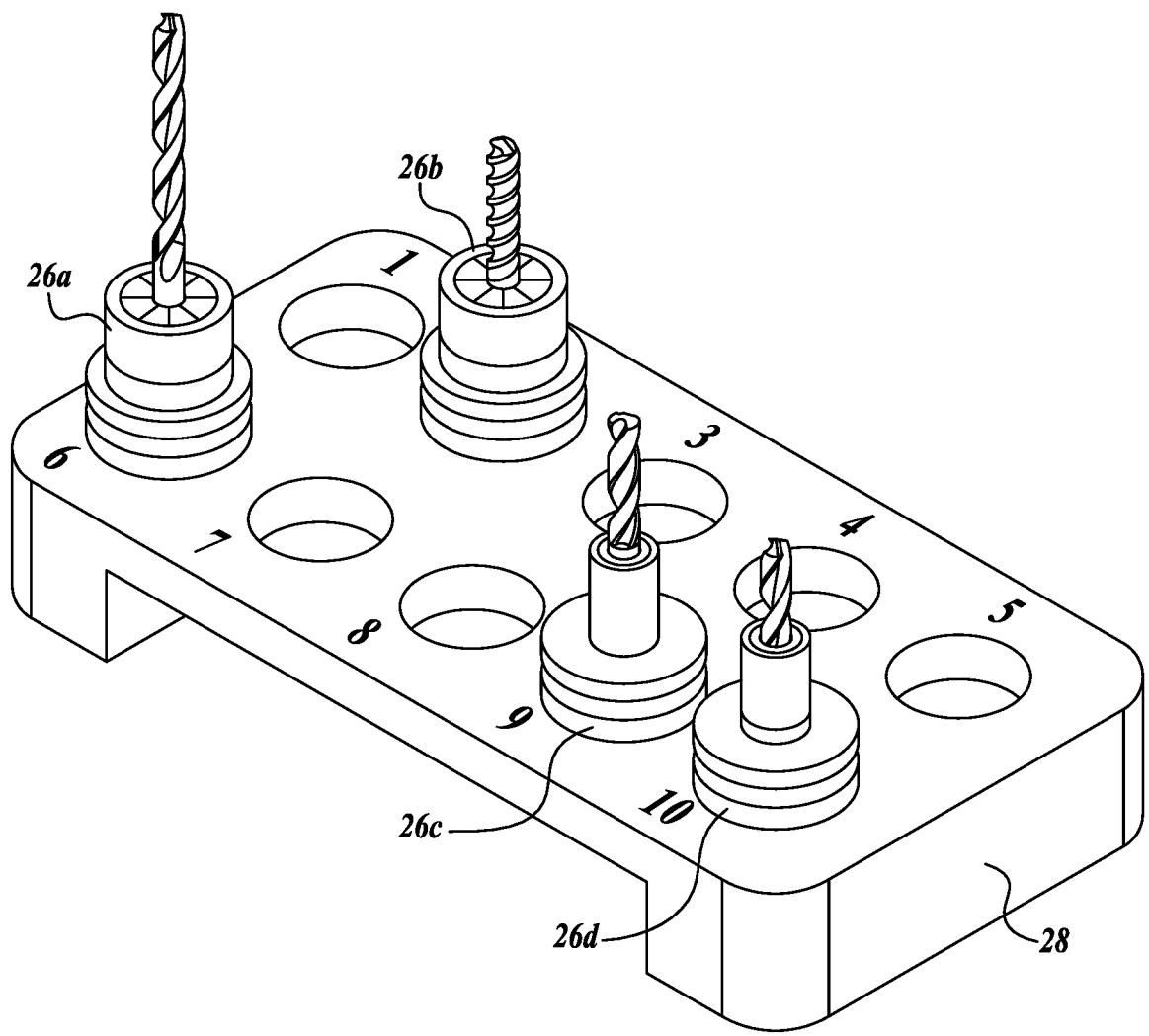
FIG. 16 a pictorial representation of a tool table loaded with a number of tools to be employed for machining a machine part.
Figure 17:
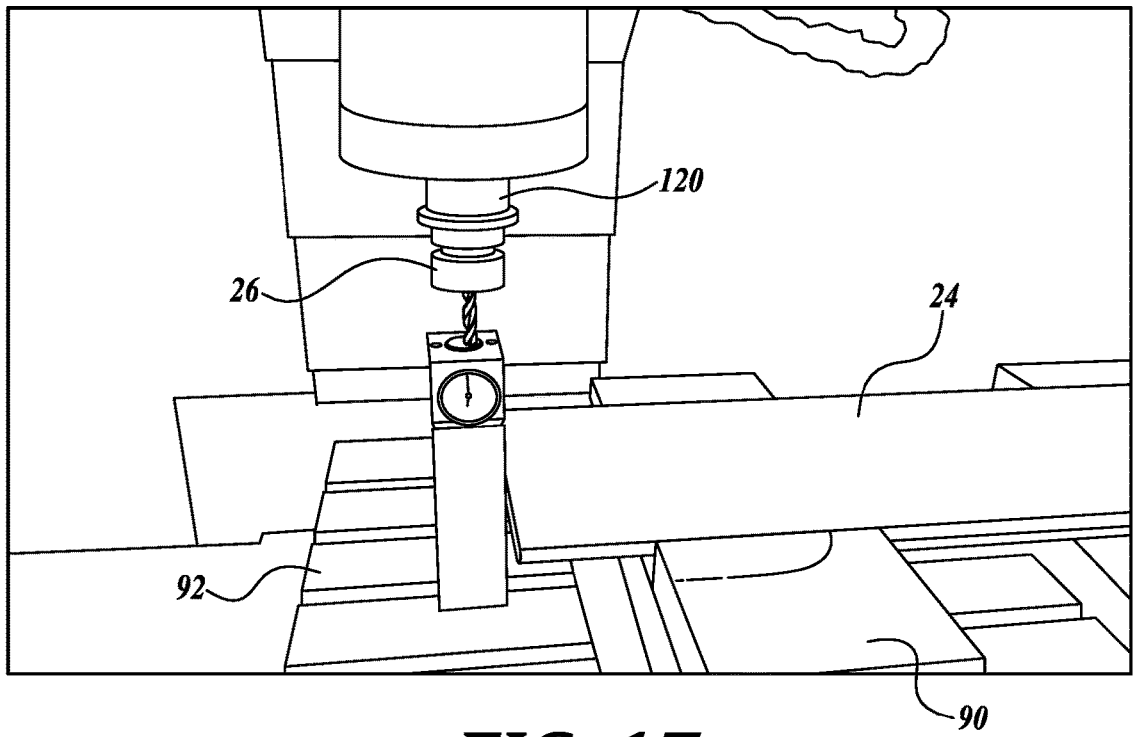
FIG. 17 a pictorial representation of obtaining tool settings when employed by a machine tool.

FIG. 7 is one embodiment of a set up routine 700 implemented by the aid of the system 30. Routine 700 starts at block 702 and continues to block 704. At block 704, tools suitable for producing the machine part are identified. Next, at block 706, parameters of each selected tool 26a-n, such as tool length, is set (See FIG. 17), and the tools are loaded into the tool table 28 (See FIG. 16). It will be appreciated that in some embodiments, a tool changer portion of the machine tool may be loaded with a variety of sized cutters, drills, tapping tools, etc. (e.g., tools 26), in order to produce the machine part. In one embodiment, the machine tool 20 is equipped with an automatic tool changer (ATC) 76 (See FIGS. 3 and 4) that automatically exchanges a tool from the tool table with the tool held by the spindle, or has an integrated tool magazine loaded with a set of tools selected by user. Each loaded tool, and its characteristics (e.g., type, size, feed rate, etc.), is stored in C4 memory to be accessed by the CAM process, described in detail below.

Figure 18:
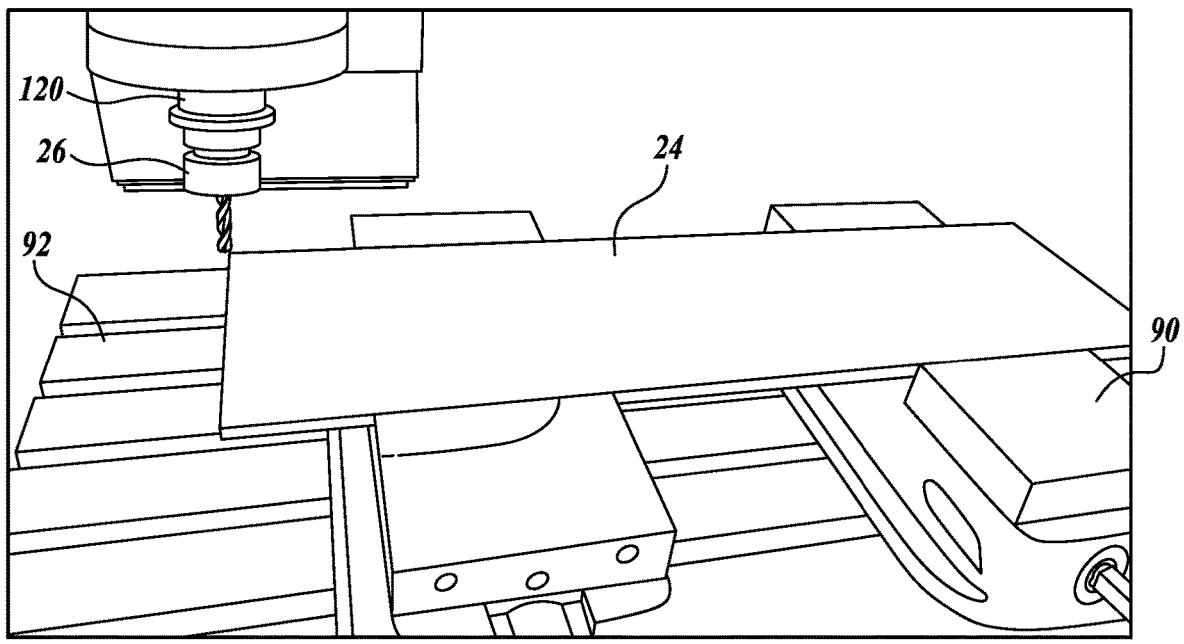
FIG. 18 a pictorial representation of the raw stock material, or workpiece, secured to the chucking fixture of the machine tool.

Raw material stock (e.g., workpiece 26), such as a steel plate or billet of aluminum, is mounted to a fixture, such as the chucking fixture 90, of the machine tool 20, and is registered relative to the orthogonal coordinates of the machine and/or CAD origin at block 710 (See FIG. 18). The setup process ends at block 712.

After the setup process is completed, the workflow process 500 continues to the CAM process. As will be described in more detail below with reference to FIG. 8, the CAM process entails the creation of toolpaths along the CAD part file that will cause the CNC of the system 30 to produce the machine part.

Figure 8:
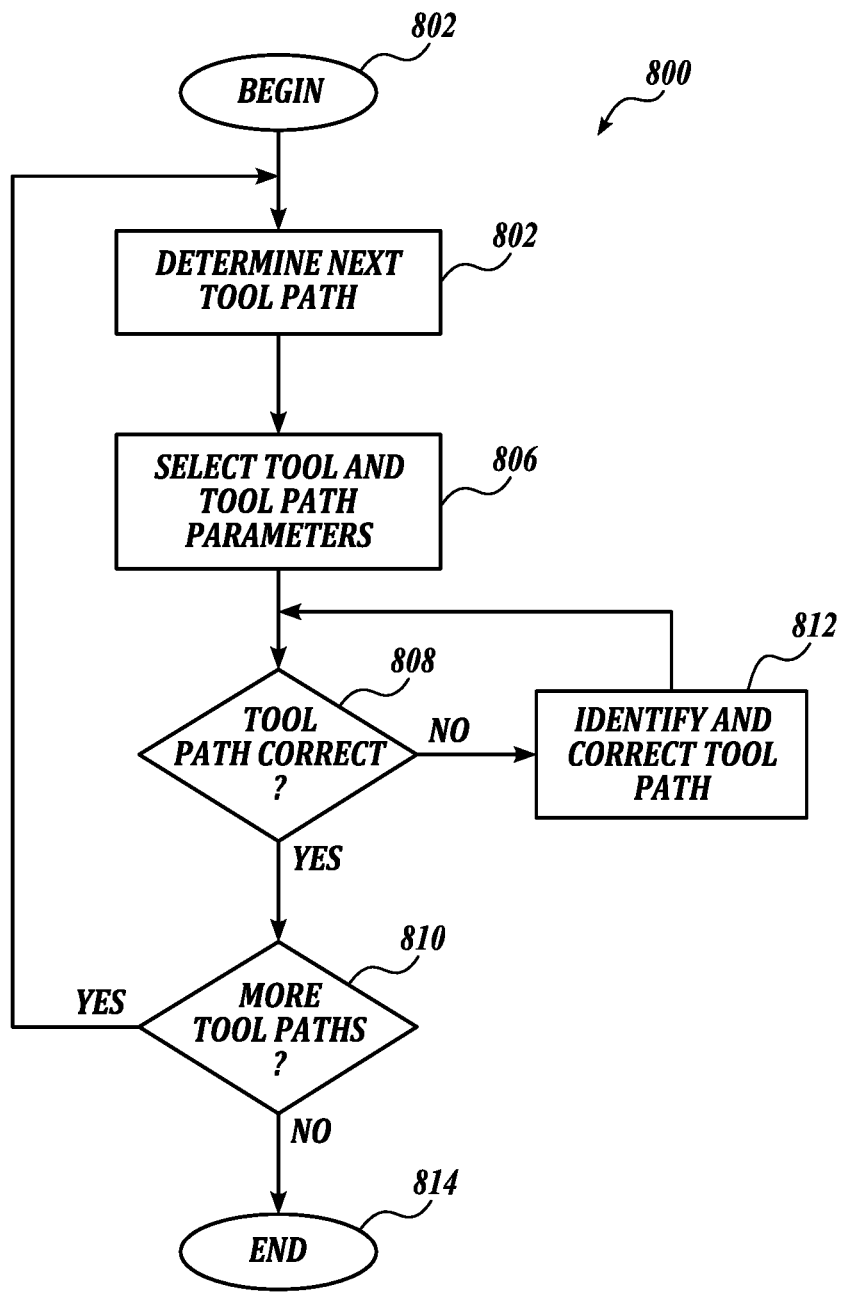
FIG. 8 is one embodiment of a routine for generating toolpaths during the CAM stage of the workflow process of FIG. 5.

FIG. 8 is one embodiment of a routine 800 implemented by the system 30 for carrying out functionality of the CAM process. Routine 800 starts at block 802 and continues to block 804. At block 804, a first toolpath is determined. For example, the CAD part file graphically illustrates a number of tapped holes (shown as 10) in FIG. 15. To generate a toolpath for drilling and tapping each hole, a "Drill and Tap" instruction is selected from a toolpath list accessible via a suitable tab or menu of the GUI. For example, the "Drill and Tap" instruction can be selected from a toolpath list accessible via the tab, generally designed Toolbox 197o of interface section 1922. After such an instruction is selected, the machine tool technician selects each hole to cut, such as via interface section 1926, and sets the appropriate cutting tool and cutting parameters, such as depth, via interface section 1914, at block 806 (shown in FIG. 19).

To carry out the generation of the tool path, the display 70 renders a GUI generated by the computing system 44. FIG. 19 is one embodiment of a GUI generated by, for example, the C4 application 74, and rendered by the display 70. As shown in FIG. 19, multiple interface sections or "windows" can be employed. For example, in the embodiment shown in FIG. 19, the upper left window shows a first interface section 1910 in the form of CAD operations. This interface section 1910 includes tabs 1930, 1492, etc., for changing or toggling between a CAD Interface, a CNC Interface, and an optional CMM Interface (not shown). Interface section 1910 further includes controls, such as drop-down menus, value inputs, checkboxes, and other input means for entering CAD information and data such as extrusion amounts, radius, offset amounts, etc.

The lower left window shows a second interface section 1914 in the form of a Tools Interface. This interface section 1914 includes tabs 1950, 1952, 1956, etc., for changing between Table of Tools, Table of Fixtures, and Feeds & Speeds. Interface section 1914 further includes controls, such as value inputs, buttons, and other input means for entering information and data, etc. Some controls in interface section 1914 may also be used to interface with the CNC devices. Of course, in some embodiments, the list of tools set forth in the Table of Tools tab and saved in C4 memory corresponds to the actual tools loaded either in the tool table 28 or the ATC 76.

The upper right window shows a third interface section 1918 in the form of a CAM Operations. This interface section 1918 includes tabs 1960, 1962 for changing between CAM Operations and a GCode Editor (e.g., this is for use when importing GCodes from a conventional CAM system). Interface section 1918 further includes controls, such as drop-down menus, value inputs, checkboxes, and other input means for entering CAM and toolpath information and data such as tools used, depths, feed rates, etc.

The lower right window shows a fourth interface section 1922. This interface section 1922 includes tabs for changing or toggling between Toolbox tab 1970, List of Toolpaths tab 1972 that lists, e.g., the toolpaths generated by interface section 1918, Properties tab 1974 for the selected toolpath from the above toolpath list and Interactive tab 1976 (a way to interact between the selected toolpath and the CMM portion of the machine). Interface section 1922 further includes controls, such as drop-down menus, value inputs, checkboxes, and other input means for entering information and data. It will be appreciated that the C4 application is configured to allow the operator to drag and drop windows to any location on the display so as to enable the operator to change the layout of the GUI according to specific preferences.

If not specified, a default rotational speed and z-axis feed rate will be assigned based on an internal feeds and speeds calculator which inputs the tool 26 from the table of tools 28 and workpiece material type and outputs the toolpath feedrate and spindle rotational speed. In some embodiments, the technician can modify these default settings in order to adjust the feeds and speeds of each cutting tool, such as via Feeds & Speeds tab 1954. As a result, a toolpath 1980 of visible elements is rendered onto the displayed CAD design. In addition to the hole toolpaths being rendered onto the display, the system 30 generates machining instructions, such as CNC machining instruction, as computer code representative of the toolpath and the associated cutting parameters for machining the machine part. It should be understood that the system 30 in some embodiments does not use GCodes or the like, but uses computer instructions native to the system 30 that can be easily executed by the system 30 during the CNC process. In other embodiments, the system can import GCodes, edit GCodes, convert Gcodes to native system language, or the like.

The routine 800 proceeds to decision block 808, where the toolpath 1980 is checked for problems. An optional simulation can be run by the system 30 that simulates the movement of the tool along the toolpath. If problems are identified, either through optional simulation or otherwise, the machine tool technician corrects the tool path through the HMI at block 812. This may also involve modifying the CAD file, which can be seamlessly done at the system 30 by the machine tool technician. For example, the technician can use first interface section 1910 (and CAD interface tab 1932 to edit the CAD information of the CAD file. Of course, any changes to the CAD information automatically updates corresponding information in the CAM information in CAM interface tab 1960 displayed in interface section 1918.

On the other hand, if the toolpath 1980 as graphically shown on the display is suitable to make the desired cut or process, the routine 800 can proceed to a decision block 810, where a determination is made as to whether another toolpath is needed for the manufacture of the machine part. If the answer is no, the routine 800 ends.

On the other hand, if the answer is yes, the routine 800 returns to block 804 and repeats the steps described above with respect to blocks 804-812. For example, in the mounting plate example, in addition to the drilled and tapped mounting holes, the mounting plate includes a number (4) of combustion chamber openings that need to be milled, as shown in FIG. 19. In this regard, to generate a toolpath for milling the number of chamber openings, a "Pocket" instruction is selected via the GUI with toolbox tab 1970, for example. After such an instruction is selected, the machine tool technician selects the four openings to cut from the CAD part displayed in window 1926 and sets a tool as, for example, a ½" endmill. Again, a toolpath 1982*a*-1982*d* of visible elements is rendered onto the displayed CAD design shown in a window of the GUI. In addition to the toolpath(s) rendered onto the display, the system 30 generates machining instructions, such as CNC machining instruction, as computer code representative of the toolpath and the associated cutting parameters for machining the machine part. After all of the toolpaths have been generated, the routine 800 ends at block 814.

After all of the toolpaths have been generated during the CAM process, the routine 500 of FIG. 5 proceeds to the CNC manufacturing stage of the workflow. As will be explained in greater detail below with reference to FIG. 9, the CNC manufacturing functionality of the system 30 carries out the machine instructions generated during the CAM process for producing the machine part.

Figure 9:
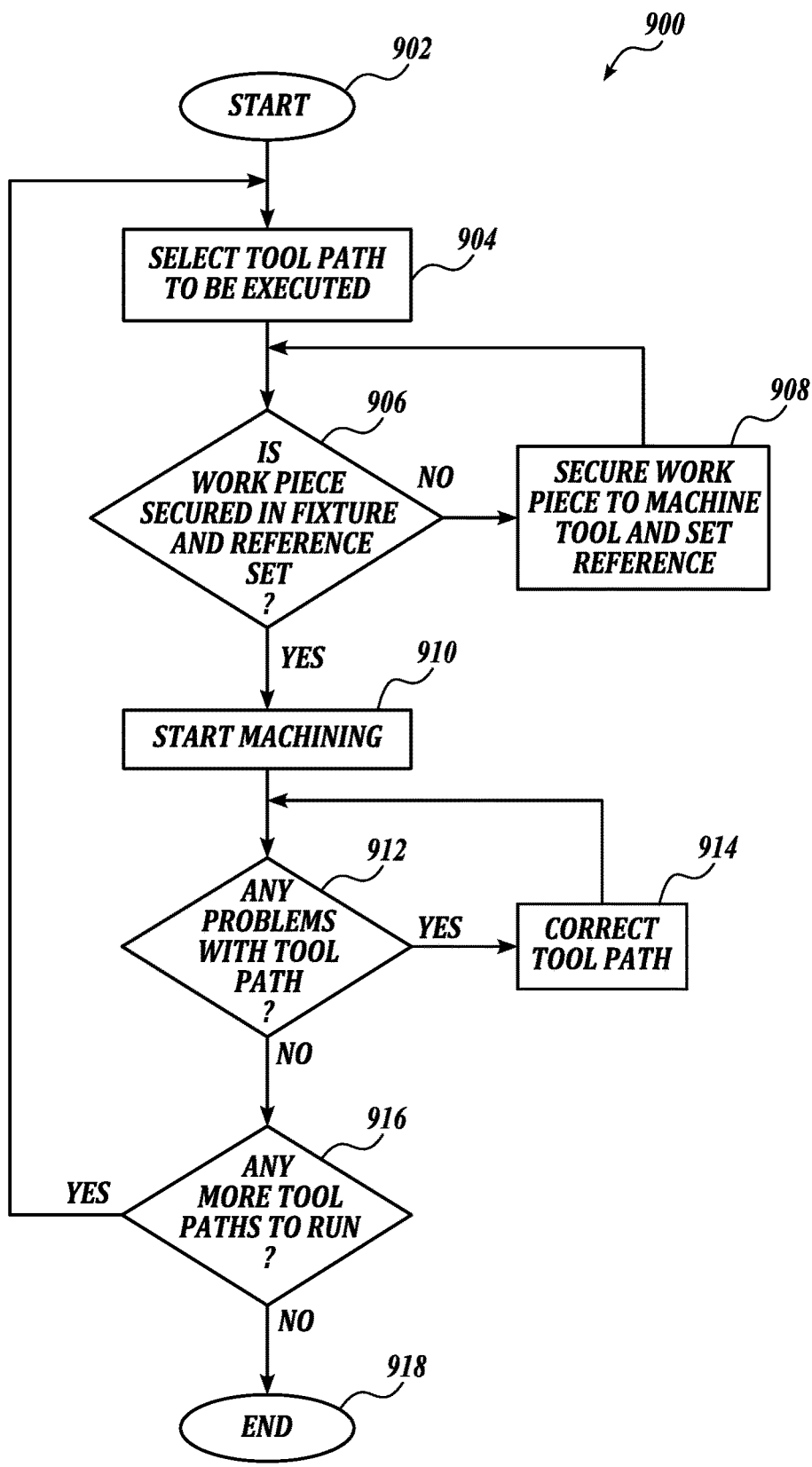
FIG. 9 is one embodiment of a routine for producing the machine part during the CNC stage of the workflow process of FIG. 5.
Figure 10:
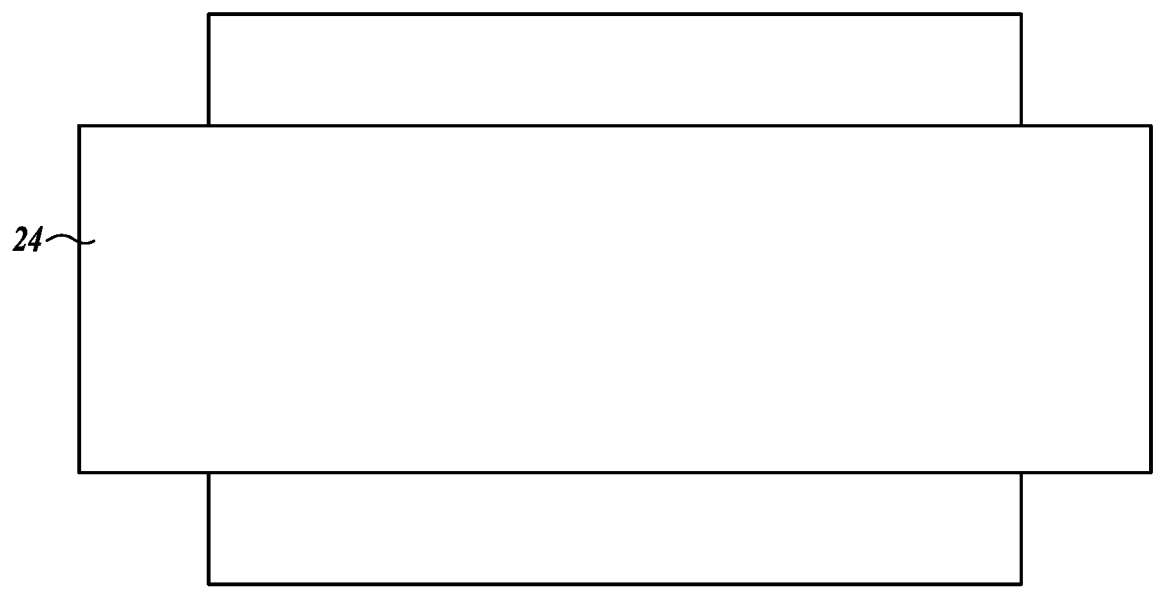
FIG. 10 is a pictorial representation of a type of raw stock material, such as steel plate.

FIG. 9 is one embodiment of a routine 900 implemented by the system 30 for carrying out CNC functionality. Routine 900 starts at block 902 and continues to block 904. At block 904, one of the toolpaths generated by the CAM process is selected. Alternatively, the operator can also select multiple toolpaths when using machine tools with ATCs. In these embodiments, the machine tool will automatically change tools and run all selected toolpaths consecutively. Next, a decision is made at decision block 906 as to whether the workpiece (e.g., raw material, such as sheet steel) is secured in the fixture and its position registered against the orthogonal coordinates of the system 30. If the answer is no, the machine tool technician at block 908 secures the workpiece and sets the reference location of the workpiece in system 30, as shown in FIG. 18. On the other hand, if the answer is yes, the routine 900 proceeds to block 910, where the machine tool begins to machine the workpiece according to the selected toolpath upon the activation of the cycle start input of the HMI (See FIG. 23, CNC Interface tab 1932).

It will be appreciated that prior to activation of the cycle start input, one or a number of safety checks can be made by the machine tool operator. For example, the operator can sequentially load the tools into the spindle and move the tool to the approximate location of where the first hole of the mounting plate is to be cut. The position of the tool is then verified on the display to confirm that the tool is located close to the drill location.

To carry out machining of the workpiece, the display 70 renders a GUI generated by the computing system 44. FIG. 23 is one embodiment of a GUI generated by, for example, the C4 application 74, and rendered by the display 70. As shown in FIG. 23, multiple interface sections or "windows" can be employed. For example, in embodiment shown in FIG. 23, the upper left window shows a first interface section 1410 in the form of CNC Interface. It will be appreciated in one embodiment, the first interface section 1910 can toggle between CAD Interface and CNC Interface by operator selectable tabs 1930, 1932. Also displayed is a central or main interface section in the form of a window that depicts the 3D CAD part with the tool traversing the selected tool path(s). In some embodiments, a tool path, such as toolpath 1980 and/or toolpath 1982, is selected from the list 1966 displayed in interface section 1918 (or optionally under the list of tool paths tab 1974 of window 1922), the CNC Interface tab 1932 is selected, and the "start" or "cycle start" button is pressed or selected in order to activate CNC machining instructions for machining the workpiece 24 with the machine tool 20 according to the selected tool path.

Figure 21:
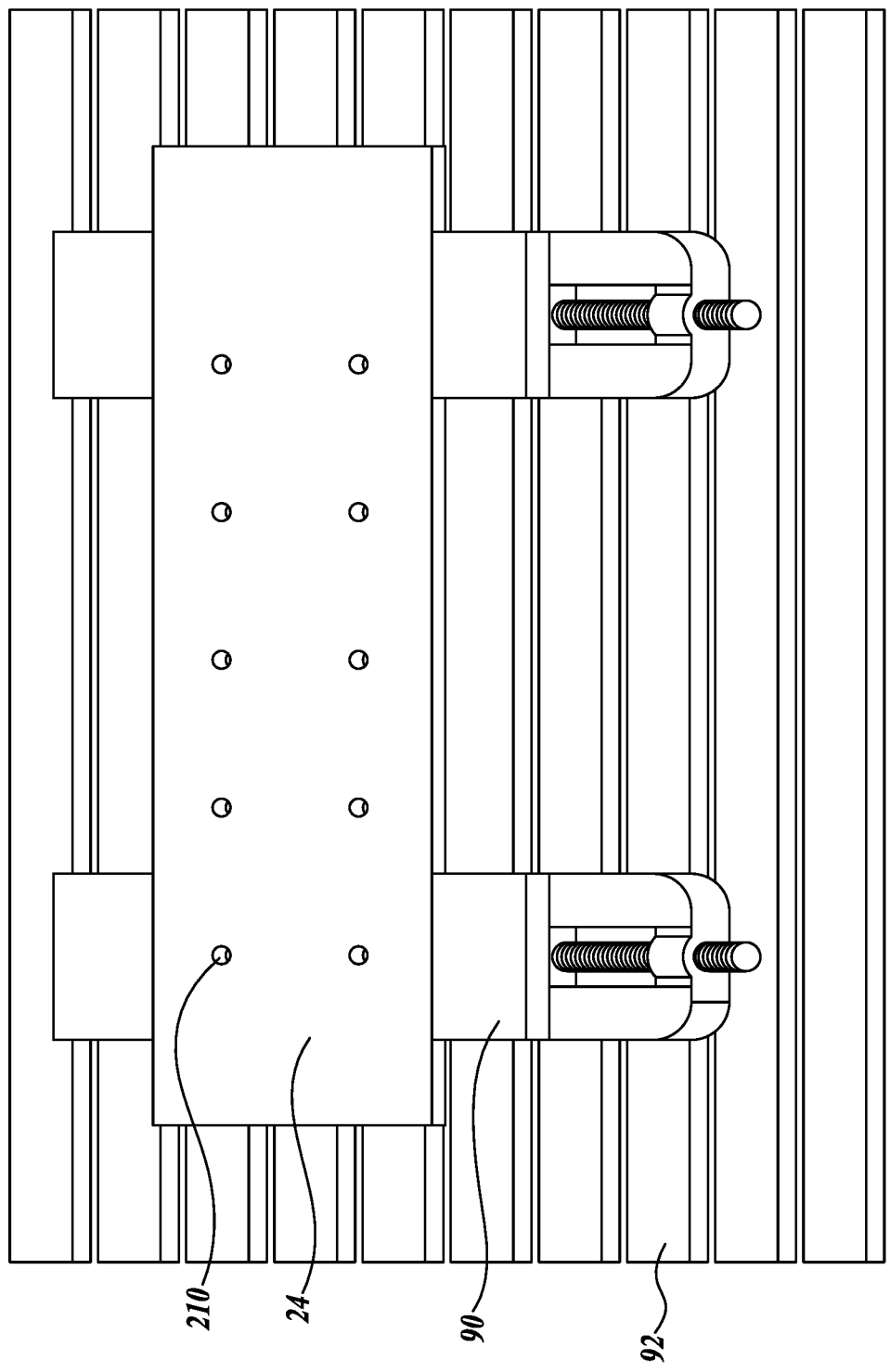
FIG. 21 is a pictorial representation of the workpiece after the first toolpath has been executed by the CNC of the machine tool.

After the machining is complete corresponding to the first toolpath 1980, the routine 900 proceeds to decision block 912. FIG. 21 is a perspective view of one example of a workpiece after machining of the first toolpath. In the embodiment show, ten holes 210 were drilled and tapped in the workpiece 24. At decision block 912, the technician determines if any problems exist with the machining of the first toolpath. If the answer is yes, the routine 900 proceeds to block 914, and the technician corrects the toolpath. This may include, for example, modifying the toolpath with the CAM functionality and/or CAD functionality of the system 20 via the HMI 40 and common GUI of the system 30. In some embodiments, any changes automatically sync to the other system processes. For example, a change to the CAM data automatically updates the corresponding CAD data, and vice versa. If the answer is no, the routine 900 proceeds to decision block 916.

At block 916, if another cutting operation is desired, the next toolpath, such as toolpath 1982, can be selected and carried out by the machine tool 20 via activation of the cycle start input.

Figure 22:
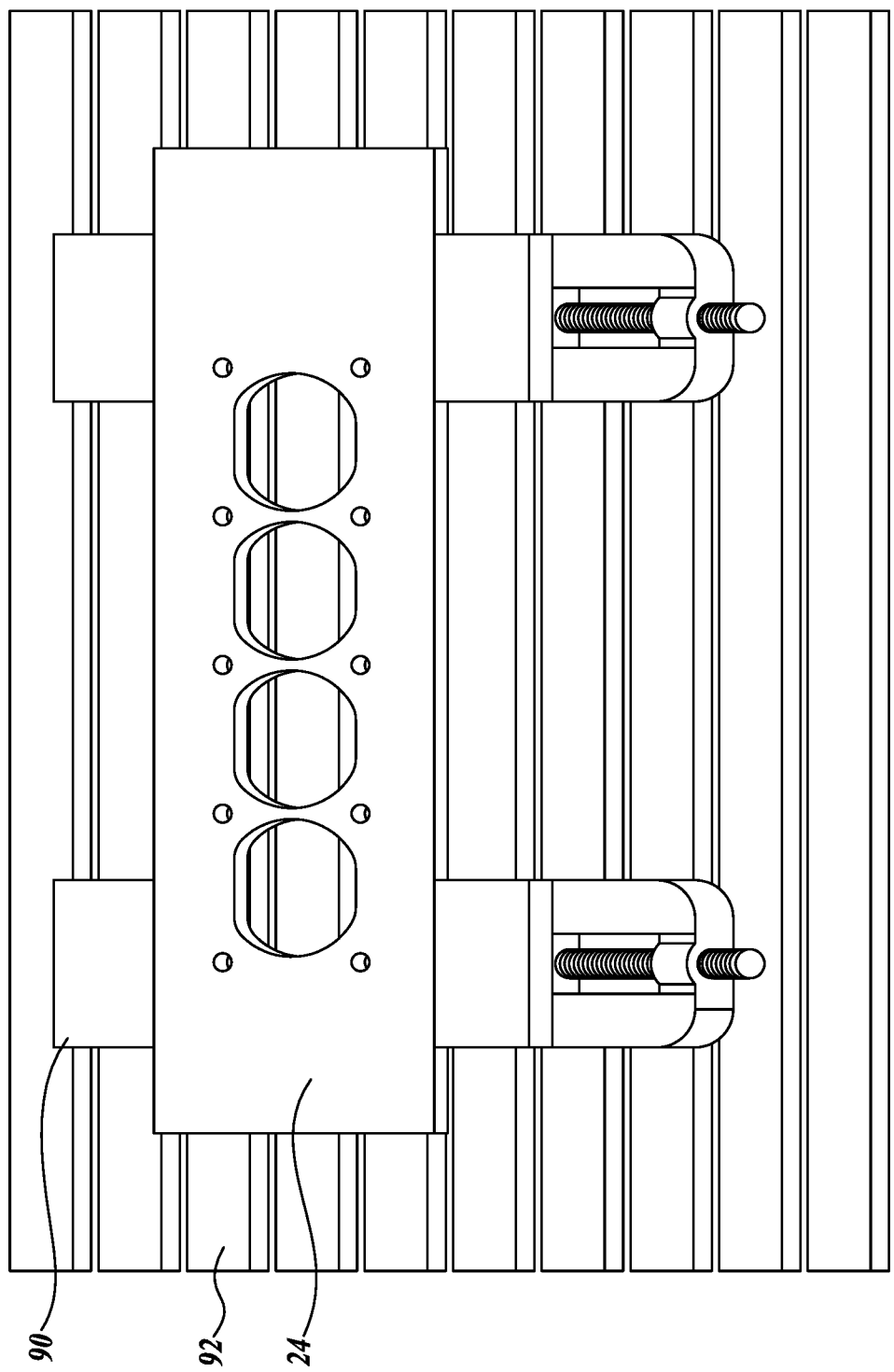
FIG. 22 is a pictorial representation of a machine part after all of the toolpaths have been executed by the CNC of the machine tool.

After all of the machine instructions are carried out, it will be appreciated that excess material may be subsequently trimmed away and/or contour trimming may be conducted. Alternatively, a manual trimming operation can be used. Other post-processing can also be performed as needed. In any event, a fully machined mounting part, such as a mounting plate, remains. FIG. 22 is a perspective view of one example of a mounting plate formed by the workflow process 500 with the aid of techniques and methodologies described herein.

In recent years, the concept of collaboration has gained mainstream acceptance in most every industry that uses Internet connected electronic devices. CAD systems are no exception. Many CAD systems connect to a central server, and CAD programs share in realtime between multiple users. These users are not limited to one physical location, rather they can be anywhere in the world and collaborate on the same CAD programs.

It will be appreciated that CAM systems can also be integrated into the same collaborative CAD systems. This allows collaboration on CAM toolpaths as well and reduces CAM changes when the CAD design are performed.

With embodiments of the integrated workstation of the present disclosure, any barrier that still exists between CAD and CAM systems and between CAM and CNC systems can be reduced or eliminated. In a conventional workflow, if a CAM operator makes changes to their toolpath strategy, this change must be manually regenerate and sent to the CNC for operation. By bringing the CNC to this same collaboration system, changes to CAD/CAM will automatically update the machine without any human efforts.

The C4 system, a PC based CAD/CAM/CNC system, is the only platform today that can be integrated with collaboration tools. The C4 system can connect to central servers via any suitable communication link. This also allows the complete CNC to benefit from collaborative systems whereas prior art non-PC based systems cannot accommodate this same level of collaboration.

In some embodiments, the C4 system or workstation can be connected to the internet. In these embodiments, any C4 system in the field can be configured to continuously report operating conditions and any errors for storage on local or distributed storage solutions, such as cloud based servers. Based on the PC nature of the C4 workstation, training and support can be carried out over internet communication tools, such as skype and logmein. Support tickets can be created by internet based services, such as DMerp.com and shared among any support people involved. Training videos are always accessible via a menu of the GUI for display in a window of the display 70, and part files can be easily shared. Cloud storage allows other users to access and use these files on other C4 workstations or on other desktop or laptop PC's.

The PC based C4 workstation also allows the ability to collaborate on any part of the C4 programming and editing process in real time. For example, one or more additional users can access the C4 machine's PC remotely and run the software on the C4 machine simultaneously with the operator in front of the machine. Each collaborator has their own HMI, such as mouse and keyboard and touchscreen. Each collaborator can perform independent part programming functions at same time on the same part. Collaborators can watch the actions of other collaborators and can be simultaneously communicating by, e.g., skype, so as to avoid interference or conflict with each other. Collaboration can be used for training, support, sharing ideas, accelerating a project, etc. It will be appreciated that any encryption protocol can be used to secure the data exchange between users or systems. In addition, some embodiments of the C4 system can employ archival or version control, such as SVN and Github, so that previously iterations of the CAD, CAM, etc., instructions be obtained, progress can be tracked, and project tasks can be split up.

The C4 system may also use artificial intelligence to improve the machine's abilities and reliability. The C4 system can also programmed to secure any data using blockchain principles. For example, records of programming, production, errors, etc., can be permanently logged. Other uses of artificial intelligence and block chain with the C4 system is foreseen.

In embodiments described above, a single processor is employed in a personal computer type setting to carry-out the computations of the system 30. It will be appreciated that in another embodiment, the system may employ a separate CPU for CNC motion control but allows the entire user interface to be implemented under one end to end Windows user interface, rendered on display 70.

The result of one or more embodiments described herein may be an integrated end to end design and manufacturing workstation system and machine tool. The workstation may include, e.g., a large screen, 4K monitor or multiple monitors to provide large screen area for better user interface efficiency. Various ergonomic implementations are possible, including a shop floor design manufacturing workstation with either sit or stand monitor and desktop computer.

In some embodiments, the system may be composed of low cost commonly available consumer level off the shelf PC motherboard running custom written Windows standard user interface desktop applications on an 32 or 64 bit Windows OS. The communication between HMI software and machine tool electronic hardware may be by means of a custom designed high speed low latency PCIe card plugged into the PC motherboard. The PC may be internet connected to allow remote support, internet search, cloud storage, etc. Windows OS provides widely known and used environment, enabling a powerful, easy to use system with short learning curve. Similar results can easily be achieved for other commonly used systems such as Android OS running on ARM CPU hardware. Other high speed low latency I/Os, such as USB type C, can be easily implemented.

While one representation computing environment has been described with reference to FIG. 3, other embodiments of the system may employ one or more components that comprise circuitry having one or more modules optionally operable for communication with one or more input/output components that are configured to relay user output and/or input. In an embodiment, a module includes one or more instances of electrical, electromechanical, software-implemented, firmware-implemented, or other control devices. Such devices include one or more instances of memory; computing devices; antennas; power or other supplies; logic modules or other signaling modules; sensors, gauges or other such active or passive detection components; etc.

In an embodiment, the system 30 includes circuitry having one or more components operably coupled (e.g., communicatively, electromagnetically, magnetically, ultrasonically, optically, inductively, electrically, capacitively coupled, or the like) to each other.

Certain embodiments disclosed herein utilize circuitry in order to operate the machine tool 20, operably couple two or more components, generate information, determine operation conditions, control an apparatus or method, and/or the like. Circuitry of any type can be used. In an embodiment, circuitry includes, among other things, one or more computing devices such as a processor (e.g., a microprocessor), a multicore central processing unit (CPU) with integrated graphical processing unit (GPU), a digital signal processor (DSP), an application-specific integrated circuit (ASIC), a field-programmable gate array (FPGA), a programmable logic controller (PLC) or the like, or any combinations thereof, and can include discrete digital or analog circuit elements or electronics, or combinations thereof. In an embodiment, circuitry includes one or more ASICs having a plurality of predefined logic components. In an embodiment, circuitry includes one or more FPGA having a plurality of programmable logic components.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like. In an embodiment, circuitry includes a baseband integrated circuit or applications processor integrated circuit or a similar integrated circuit in a server, a cellular network device, other network device, or other computing device. In an embodiment, circuitry includes one or more remotely located components. In an embodiment, remotely located components are operably coupled via wireless communication. In an embodiment, remotely located components are operably coupled via one or more receivers, transmitters, transceivers, or the like.

In an embodiment, circuitry includes one or more memory devices that, for example, store instructions or data. Non-limiting examples of one or more memory devices include volatile memory (e.g., Random Access Memory (RAM), Dynamic Random Access Memory (DRAM), or the like), non-volatile memory (e.g., Read-Only Memory (ROM), Electrically Erasable Programmable Read-Only Memory (EEPROM), Compact Disc Read-Only Memory (CD-ROM), or the like), persistent memory, or the like. Further non-limiting examples of one or more memory devices include Erasable Programmable Read-Only Memory (EPROM), flash memory, or the like. The one or more memory devices can be coupled to, for example, one or more computing devices by one or more instructions, data, or power buses. In some embodiments, a graphically user interface (GUI) is stored on the one or more memory devices and executed by a processor or the like.

In an embodiment, circuitry of the machine tool 20 includes one or more computer-readable media drives, interface sockets, Universal Serial Bus (USB) ports, memory card slots, or the like, and one or more input/output components such as, for example, a graphical user interface, a display, a keyboard, a keypad, a trackball, a joystick, a touch-screen, a mouse, a switch, a dial, or the like, and any other peripheral device. In an embodiment, circuitry includes one or more user input/output components that are operably coupled to at least one computing device to control (electrical, electromechanical, software-implemented, firmware-implemented, or other control, or combinations thereof) at least one parameter associated with the machine tool 20.

In an embodiment, circuitry of the client device or the appliance 20 includes a computer-readable media drive or memory slot configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

Many alternatives to the user interfaces described herein are possible. In practice, the user interfaces described herein may be implemented as separate user interfaces or as different states of the same user interface, and the different states can be presented in response to different events, e.g., user input events. The elements shown in the user interfaces can be modified, supplemented, or replaced with other elements in various possible implementations.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. The term "about" means plus or minus 5% of the stated value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A computer implemented method for machining a workpiece with one or more tools via one or more machining operations on an integrated workstation, the computer implemented method comprising:
    rendering a graphical user interface (GUI) having a number of interface sections, each interface section having one or more control elements, wherein a first interface section of the number of interface sections displays one or more control elements that provide computer aided manufacturing (CAM) control, a second interface section of the number of interface sections displays one or more control elements that provide computer aided design (CAD) control, and a third interface section of the number of interface sections displays a list of the one of more tools;
    obtaining computer aided design (CAD) data indicative of a machine part to be manufactured, wherein the second interface section is configured to manipulate the CAD data;
    generating computer aided manufacturing (CAM) instructions from the CAD data without the use of GCodes, the (CAM) instructions generated via user interaction with the first interface section;
    machining the workpiece according to the generated CAM instructions.

2. The computer implemented method of claim 1 wherein said obtaining a computer aided design (CAD) data indicative of a machine part to be manufactured includes one action selected from a group of actions consisting of creating the computer aided design (CAD) data based on operator input; generating the computer aided design (CAD) data via a coordinate measurement machining (CMM) process, or fetching the computer aided design (CAD) data from a parts library stored in memory.

3. The computer implemented method of claim 2, wherein creating the CAD data includes carrying out a sequence of CAD operations that includes user input, wherein the sequence of CAD operations are rendered in the second interface section of the GUI as a list of operations that includes editable parameters.

4. The computer implemented method of claim 3, wherein said generating CAM instructions includes
    generating a first tool path with user inputted parameters via the first interface section; and
    generating a second tool path with user inputted parameters via the first interface section.

5. The computer implemented method of claim 4, further comprising changing at least one parameter of the user inputted parameters of the first or second tool path, wherein a change to the least one parameter automatically changes a corresponding editable parameter of the CAD data.

6. The computer implemented method of claim 4, wherein said machining the workpiece according to the generated CAM instructions includes, via user input, selecting at least one of the first and second tool paths and activating, via user input, CNC start instructions.

7. A computer controlled apparatus for machining a workpiece, the apparatus comprising:
 a base;
 a workpiece support mounted on the base and configured to support a workpiece;
 a set of tools, each tool configured to remove material from the workpiece;
 a spindle configured to carry and rotate a tool from the set of tools;
 one or more drives configured and arranged to move the spindle with respect to the workpiece, the one or more drives including one or more electric motors;
 a computing device supported by or position adjacent the base, the computing device comprising a single processor and non-transitory computer readable medium that stores data indicative of the set of tools and instructions that when implemented by the single processor, cause the computing device to:
 create computer aided design (CAD) data indicative of the machine part to be machined based on data input from a user via at least one input device connected in communication with the computing device;
 generate, with the aid of user input via the one or more input devices, computer aided manufacturing (CAM) instructions based on the CAD data and the data indicative of the set of tools and without the use of GCodes;
 machine the workpiece according to the generated CAM instructions in order to create at least part of the machine part.

8. The computer controlled apparatus of claim 7, wherein the non-transitory computer-readable medium further includes instructions stored thereon that, when executed by the single processor, cause the computing device to:
 render, on a display, at least a first interface section, a second interface section and a third interface section, wherein each of the first, second and third interface sections include user selectable controls;
 receive a request from one of the first, second or third interface sections to generate the CAM instructions corresponding to the CAD data rendered by the computing display;
 in response to receiving the request, generate the set of CAM instructions; and
 receive a request from one of the interface sections to begin machining the workpiece, the request causing execution of the set of CAM instructions and movement of the spindle.

9. The computer controlled apparatus of claim 7, wherein the non-transitory computer-readable medium further includes instructions stored thereon that, when executed by the single processor, cause the computing device to:
 render, on a display, at least a first interface section, a second interface section and a third interface section, wherein each of the first, second and third interface sections include user selectable controls;
 create the computer aided design (CAD) part, via one of the first, second, or third interface sections, based on a plurality of user inputs representing a sequence of operations; and
 render, on the display, a list indicative of the sequence of operations inputted by the user in one of the first, second, or third interface sections.

10. The computer controlled apparatus of claim 9, wherein the non-transitory computer-readable medium further includes instructions stored thereon that, when executed by the single processor, cause the computing device to:
 receive a request to edit information displayed by the list indicative of the sequence of operations via one of the user selectable controls; and
 in response to receiving the request to edit said information, automatically editing information associated with the CAM instructions that corresponds to the edited information.

11. The computer controlled apparatus of claim 8,
 wherein the set of CAM instructions to be generated include one or more tool paths, the tool paths represented by computer instructions for producing a feature of the geometric representation of the machine part, each tool path being rendered on the display in one of the interface sections; and
 wherein receipt of the request from one of the interface sections to begin manufacturing the machine part causes controlled movement of one or more tools from the set of tools for machining the workpiece according to the generated tool paths without conversion of said computer instructions.

12. The computer controlled apparatus of claim 8, wherein the first interface section is configured to provide CAM control; and wherein the second interface section is configured to toggle between CAD control and CNC control via user input.

13. The computer controlled apparatus of claim 7, further comprising instructions stored on the computer readable media that when executed by the single processor, cause the computing device to:
 generate the CAD data representative of the machine part via user interaction with a first graphical user interface section displayed on a display;
 generate first and second tool paths corresponding to the CAD data via user interaction with a second graphical user interface section displayed on the display; and
 move the spindle according to the one of the first or second generated tool paths via user interaction with the first graphical user interface section or a third graphical user interface section di splayed on the display.

14. The computer controlled apparatus of claim 13, further comprising instructions stored on the computer readable media that when executed by the single processor, cause the computing device to:
 receive at least one change in at least one parameter of user inputted parameters of the first or second tool path, and
 automatically change a corresponding parameter of the CAD data based on the at least one change in the least one parameter of the user inputted parameters of the first or second tool path.

15. The computer controlled apparatus of claim 14, further comprising instructions stored on the computer readable media that when executed by the single processor, cause the computing device to:

select, via user input, at least one of the first and second tool paths displayed in one of the interface sections for machining the workpiece according to the generated CAM instructions; and activate, via user input, CNC start instructions.

* * * * *